United States Patent [19]

Crossland et al.

[11] Patent Number: 5,576,873
[45] Date of Patent: Nov. 19, 1996

[54] TELECOMMUNICATIONS SWITCH ARCHITECTURE

[75] Inventors: William A. Crossland; Robert W. Scarr, both of Essex; Martin J. Birch, Middlesex; Adrian P. Sparks, Essex, all of United Kingdom

[73] Assignee: Northern Telecom Limited, Montreal, Canada

[21] Appl. No.: 379,515

[22] PCT Filed: Jul. 27, 1993

[86] PCT No.: PCT/GB93/01584

§ 371 Date: May 3, 1995

§ 102(e) Date: May 3, 1995

[87] PCT Pub. No.: WO94/04007

PCT Pub. Date: Feb. 17, 1994

[30] Foreign Application Priority Data

Aug. 1, 1992 [GB] United Kingdom ............ 9216412

[51] Int. Cl.⁶ ............................................. H04J 14/00
[52] U.S. Cl. .................. 359/117; 359/109; 364/713; 385/17
[58] Field of Search ..................... 359/109, 117, 359/128, 139; 364/713; 385/17; 370/58.1, 59

[56] References Cited

U.S. PATENT DOCUMENTS 4,740,953  4/1988  Matsumoto et al. ............... 370/58
5,301,055  4/1994  Bagchi et al. ...................... 359/117
5,325,224  6/1994  Lang et al. ........................ 359/117

FOREIGN PATENT DOCUMENTS 0042666  12/1981  European Pat. Off. .
0378122  7/1990  European Pat. Off. .

Primary Examiner—Wellington Chin
Assistant Examiner—Kinfe-Michael Negash
Attorney, Agent, or Firm—Lee, Mann, Smith, McWilliams, Sweeney & Ohlson

[57] ABSTRACT

Telecommunications switch architectures and switching methods based on the principle of replication/broadcasting some or all of the incoming data from each input-switch port to all output switch ports. The replicated data is transferred to the output ports either by the respective output port reading directly from a relevant address in an input memory, or by transferring the content of all or part of the input memory data simultaneously en bloc and in parallel to a plurality of output memories, with each output port then taking the data intended therefor. The input and output data is in serial form but transferred in parallel form. The data can be replicated optically or electronically. In particular, the input data can be formatted as spatially arranged pages in the optical domain by spatial light modulators (SLM) and switched by an image replicating optical switch, such as a matrix-matrix switch, to an output plane at which a second SLM device converts the data back to serial form. The SLM's may be based on FELC/VLSI technology. A mixture of ATM and STM data can be switched in a single arrangement.

19 Claims, 18 Drawing Sheets

INPUT LINKS

OUTPUT LINKS

Fig. 10a.

| L1 | | L2 | |
|----|----|----|----|
| L2 | L2 | L1 | L1 |
| L3 | L4 | L3 | L4 |
| L4 | S&F | L3 | LOC |
| L2 | L4 | L2 | L1 |
| L4 | L1 | L1 | L3 |
| L4 | L1 | L2 | L2 |

L3       L4

S & F STORE AND FORWARD. LOC=LOCAL

Fig. 10b.

| | | L2 | L2 |
|---|---|---|---|
| | | | |
| | | | |
| | | | L4 |
| | L3 | L3 | |
| | L3 | | |

LINK 1

| L1 | L1 | | |
|---|---|---|---|
| | | | |
| | | | |
| | | | |
| L3 | | L4 | |
| | | | |
| | | L4 | L4 |

LINK 2

Fig. 11.

| L1 | | L2 | |
|----|----|----|----|
| L2 | L2 | S&F | S&F |
| L3 | L3 | L1 | L1 |
| L4 | L4 | L2 | L2 |
| LOC | LOC | L3 | L3 |
| S&F | S&F | LOC | LOC |
| LOC | LOC | L4 | L4 |
| S&F | S&F | S&F | S&F |
| L1 | L1 | LOC | LOC |
| L2 | L2 | L1 | L1 |
| L3 | L3 | L2 | L2 |

L3       L4

D = ADDRESS DECODE, SERIAL TO PARALLEL CONVERSION AND MEMORY WRITE
M = MEMORY
R = READ OUT
D/I = LOCAL DROP AND INSERT

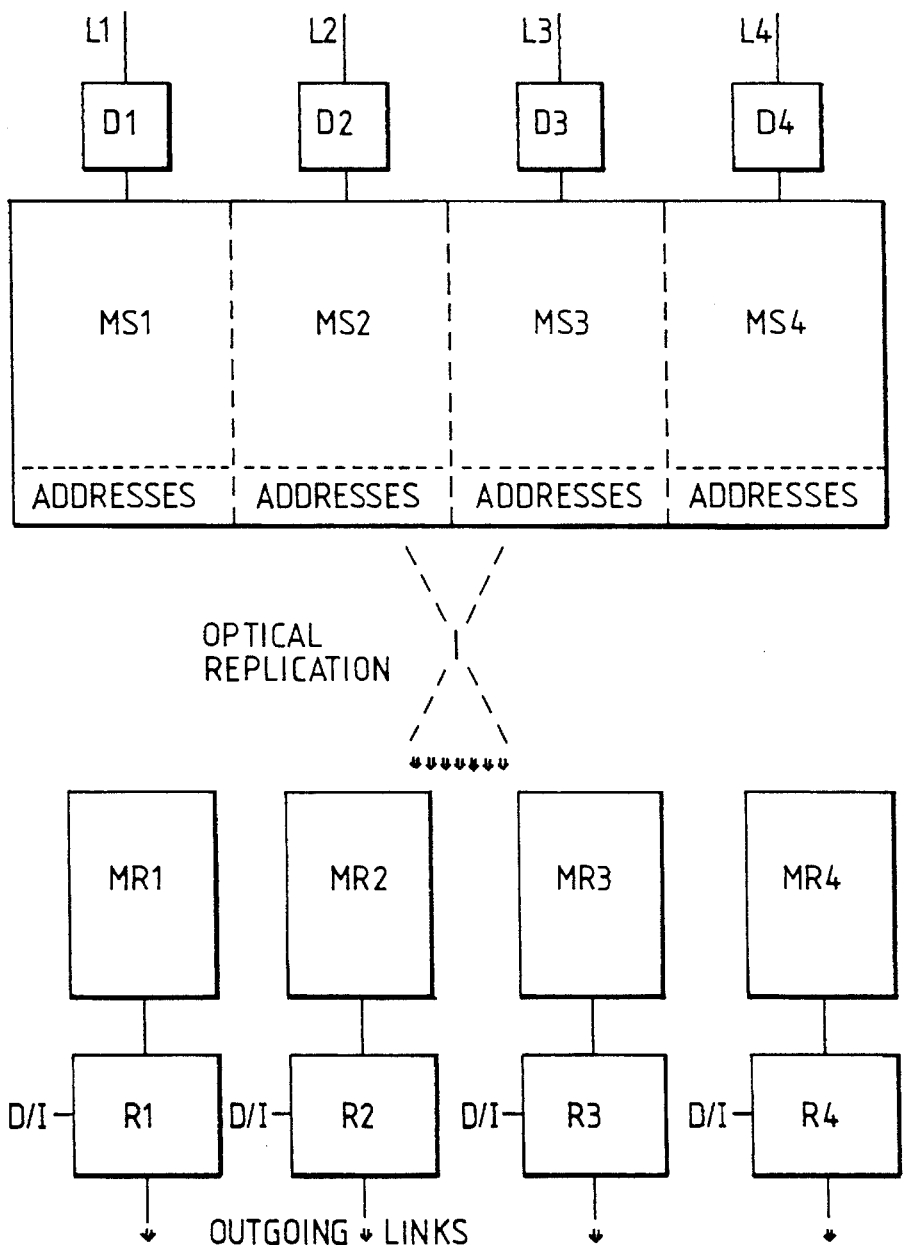

| No. OF LINKS N | $M_i+M_o$ | $M_{is}+M_{os}$ $\sigma=$ 1.1 * B | 1.2 * B | 1.3 * B | 1.4 * B | X pts 2N/N |
|---|---|---|---|---|---|---|
| 4 | 28 | 17.6 | 19.2 | 20.8 | 22.4 | 16 |
| 8 | 88 | 35.2 | 38.4 | 41.6 | 44.8 | 48 |
| 16 | 304 | 70.4 | 76.8 | 83.2 | 89.6 | 128 |
| 32 | 1120 | 140.8 | 153.6 | 166.4 | 179.2 | 384 |
| 64 | 4288 | 281.6 | 307.2 | 332.8 | 358.4 | 1024 |
| 128 | 16768 | 563.2 | 614.4 | 665.6 | 716.8 | 3072 |

| No. OF LINKS N | $M_O$ | $M_{os}$ | | | | X pts |
| --- | --- | --- | --- | --- | --- | --- |
| | | $\sigma = 1.1 * B$ | $1.2 * B$ | $1.3 * B$ | $1.4 * B$ | $2N/N$ |
| 4 | 32 | 8.8 | 9.6 | 10.4 | 11.2 | 16 |
| 8 | 128 | 17.6 | 19.2 | 20.8 | 22.4 | 48 |
| 16 | 512 | 35.2 | 38.4 | 41.6 | 44.8 | 128 |
| 32 | 2048 | 70.4 | 76.8 | 83.2 | 89.6 | 384 |
| 64 | 8192 | 140.8 | 153.6 | 166.4 | 179.2 | 1024 |
| 128 | 32768 | 281.6 | 307.2 | 332.8 | 358.4 | 3072 |

Fig. 20.
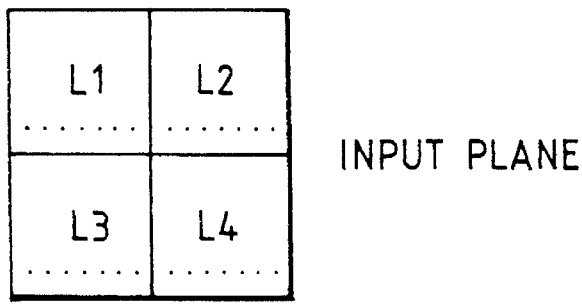
INPUT PLANE
SHUTTER PLANE
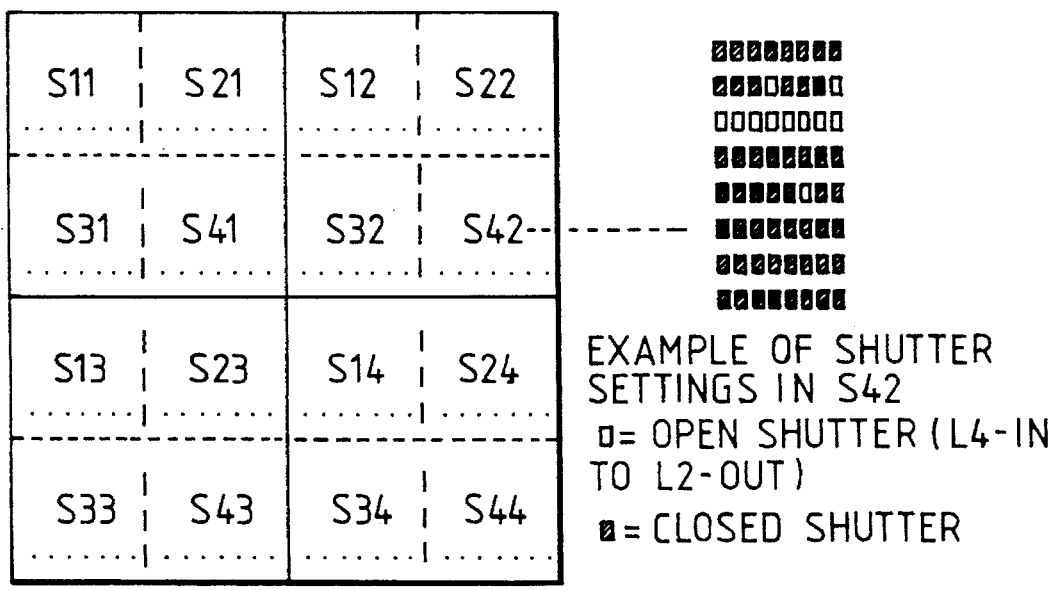
EXAMPLE OF SHUTTER SETTINGS IN S42
▫ = OPEN SHUTTER (L4-IN TO L2-OUT)
▪ = CLOSED SHUTTER
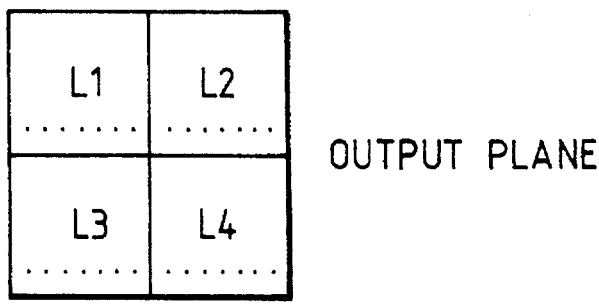
OUTPUT PLANE
...... CONTROL CELLS

Fig. 21.
INPUT→     INPUT→OUTPUT
SHUTTER
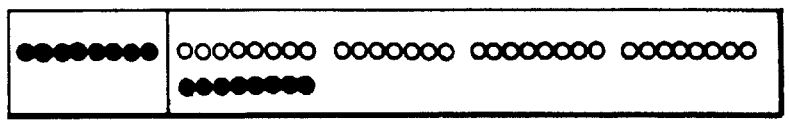
INPUT LINK 1 CONTROL AREA
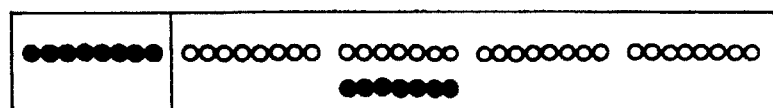
INPUT LINK 2 CONTROL AREA
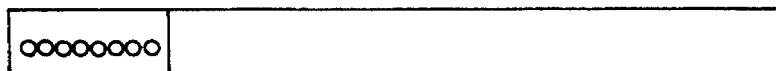
SHUTTER PLANE - EXAMPLE OF A CONTROL AREA RECEIVER
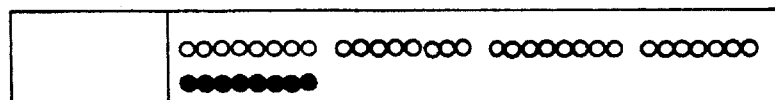
OUTPUT LINK 1 CONTROL AREA
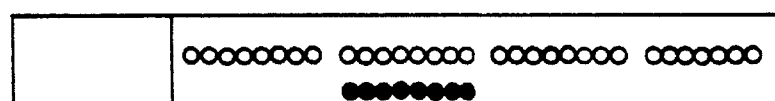
OUTPUT LINK 2 CONTROL AREA
●●●●●●● TRANSMITTERS
ooooooo RECEIVERS

Fig. 24.
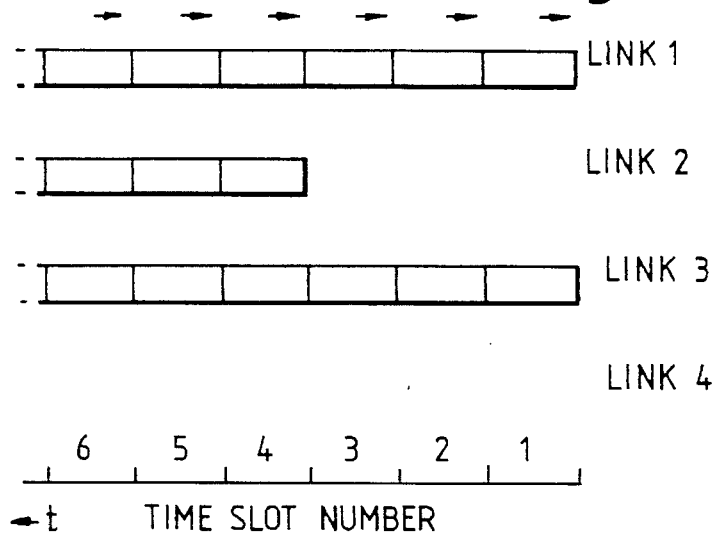
(a) REPRESENTATION OF INCOMING DATA STREAM
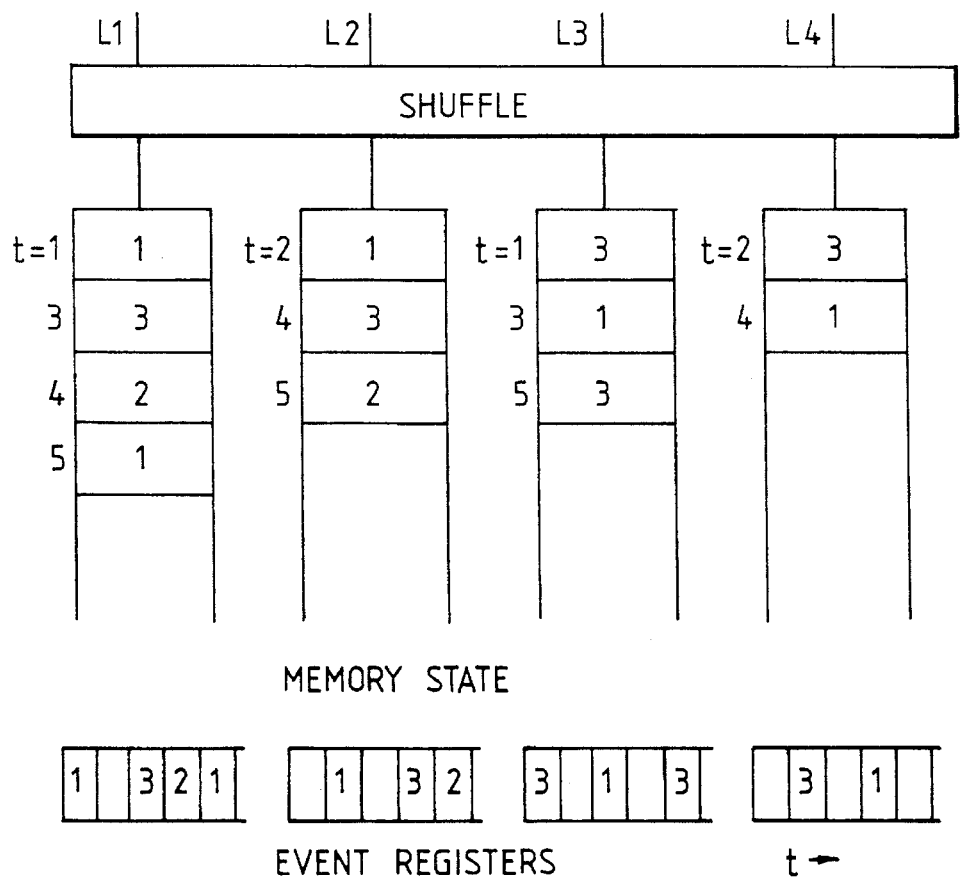
(b) MEMORY OCCUPANCY AT TIME SLOT 5

TELECOMMUNICATIONS SWITCH ARCHITECTURE

This invention relates to telecommunications switch architecture, and in particular but not exclusively to architectures for use in multi-service environments rather than just the conventional voice traffic as in a PSTN (Public Switched Telephone Network)

BACKGROUND OF THE INVENTION

Speech and data signals are more and more being transmitted optically rather than electrically, however switching is performed in the electrical mode. Optical switching has been suggested particularly in order to obviate the need for opto-electronic interfaces which add to the system complexity and cost. However, the relatively low operating speed of currently available optical switch elements places a severe restriction on the system bit rate. The present invention is concerned with a switching architecture that can be embodied in both optical and electronic form For the circuit switching of digital channels TST (Time-Space-Time) or STS (Space-Time-Space), for example, are used in 64 kbit/s networks. These types of switching can be made to be non-blocking or to have a low blocking probability but are characterised by:

(1) fixed length data, i.e. 8 bits, (2) fixed bandwidth per channel, (3) no contention for output channels.

Clearly with these basic structures there are a number of problems with handling packets.

In a multi-service SDH (Synchronous Digital Hierarchy) there can be a mixture of 8 bit information in Synchronous Transfer Mode (STM) and packets in Asynchronous Transfer Mode (ATM). With packets there is contention for channels because packets for a given output channel can arrive simultaneously on a number of input channels and temporarily overload that output channel. Thus internal queues are required and if these queues overload then traffic can be lost. With all known designs there is a finite probability that this will happen.

In an SDH multiplex, ATM cells and their headers are, once the frame overhead is removed, contiguous bits in the bit stream, whereas STM information at, say the 2 Mbit/s level is distributed throughout the frame. This means that incoming ATM information can be switched on the fly but a frame store is necessary before STM information can be switched.

In the past these conflicting requirements have resulted in switch designs that either deal with ATM switching in isolation or, if not, the circuit packet switching are segregated into separate modules. For example, in the RACE context (R&D in Advanced Communication Technologies in Europe), the RACE BLNT design ATM only (A. L. Fox et al "RACE BLNT: a technology solution for broadband networks." Integrated Broadband Services and Networks, IEE Conference Publication No. 329, October 1990, pp 47–57), the ATMOSPHERIC switch had separate ATM and STM sections (D. G. Fisher et al "An open/network architecture for integrate broadband communications". Integrated Broadband Services and Networks, IEE Conference Publication No. 329, October 1990, pp 73–78). The BERKOM project uses an ATM switch (H. Armbruster et al "Phasing-in the universal broadband ISDN: initial trials for examining ATM applications and ATM systems" Integrated broadband Services and Networks. IEE Publication No. 329, October 1990, pp 200–205). Gauss is an ATM switch (R. J. F. de Vries "Guass: a single-stage ATM switch with output buffering". Integrated Broadband Services and Networks, IEE Conference Publication No. 329, October 1990, pp 248–252. The ATMOSPHERIC switch also contains an overload policing function to prevent users trying to use more resources than were negotiated at call set-up time. Another known switch, which is a packet only switch is Knockout (Y-S Yen et al "The Knockout Switch: a simple, modular architecture for high-performance packet switching" IEE Journal on selected Areas in Communication, Vol SAC-5, No. 8, October 1987, pp 1274–1283). The Knockout switch uses a fully interconnected switch fabric topology (i.e. each input has a direct path to every output) so that no switch blocking occurs where packets destined for one input interfere with (block or delay) packets going to different outputs. It is only at each output of the switch that one encounters the unavoidable congestion caused by multiple packets simultaneously arriving on different inputs all destined for the same output. Taking advantage of the inevitability of lost packets in a packet-switching network, the Knockout switch uses a concentrator design at each output to reduce the number of separate buffers needed to receive simultaneously arriving packets. Following the concentrator, a shared buffer architecture provides complete sharing of all buffer memory at each output and ensures that all packets are placed on the output line on a first-in first-out basis. Knockout appears to be the first switch design that used a broadcast approach, i.e. all the incoming channels broadcast their outputs to all the outgoing channels. Gauss also uses a broadcast approach which gives it its non-blocking property. Gauss is specific to the RACE environment and is modular at the STM-1 level. It differs principally from Knockout in the way concentration and output data queuing is achieved. A further switch construction is disclosed in U.S. Pat. No. 4,740,953 which describes a time division speech path switch having a plurality of speech path memories for each highway and wherein input highway information is stored simultaneously in all of the speech path memories.

SUMMARY OF THE INVENTION

According to the present invention there is provided a switching architecture, including a plurality of incoming links and a plurality of outgoing links, for switching data between the incoming and outgoing links, which data is in serial form on said incoming links, the architecture further including means for converting said serial data into parallel form and comprising, for each incoming link, address decode and memory write means; one or more input memory blocks in which said data is stored at specific addresses; means for replicating the data whereby all incoming data are available for all or selected outgoing links, said converting, storing and replicating means being interconnected whereby the storage occurs before the replication or concurrently therewith and the replication occurs when the data is in serial or parallel form; means for each replication, for transferring data from one of said memory blocks to the appropriate one of said outgoing links, which transfer means is either such as to read directly from the relevant address in said input memory blocks or such as to transfer the content of all or part of said input memory blocks simultaneously en bloc and in parallel to a plurality of output memory blocks, each associated with a respective outgoing link; and means for each outgoing link for taking the incoming data intended therefor and reading that data out in serial form, wherein there is a respective source memory for each incoming link, the decoded address information being stored in a respective area of the source memory, each of which source memories comprises a said input memory block, wherein means are provided to convert the source memory content to optical form and the replicating means comprises optical replicating means for acting on said optical form of the source memory content, there being a respective destination memory for each said outgoing link, each of which destination memories comprises a said output memory block, a respective read-out means being connected to each said destination memory, each outgoing link being connected to a respective read-out means and the read-out means serving only to read out the memory content intended for that outgoing link as determined from said stored address means, and including central or distributed control means controlling the operation of the decode and memory link means, the source memories, the destination memories and the read-out means.

BRIEF DESCRIPTION OF THE DRAWINGS

Embodiments of the invention will now be described with reference to the accompanying drawings, in which

FIGS. 10a and 10b indicate memory utilisation charts, an input memory chart with destination addresses and an output memory chart with source addresses;

FIG. 11 indicates input memory assignments;

FIG. 14 illustrates a revised schematic for ETOSET;

FIG. 20 illustrates schematically the three planes of the switch;

FIG. 21 illustrates control area communications with four links;

FIGS. 24a and 24b illustrate output memory and an example of packing process for link 4, in particular representation of incoming datastream and memory occupancy at the time slot 5, respectively.

DESCRIPTION OF PREFERRED EMBODIMENTS

The switching architectures of the present invention are based on the principle of replication or broadcasting of some or all incoming information from each input port to all output switch ports. The concept is first described hereinafter in terms of a packet switch.

Figure 1:
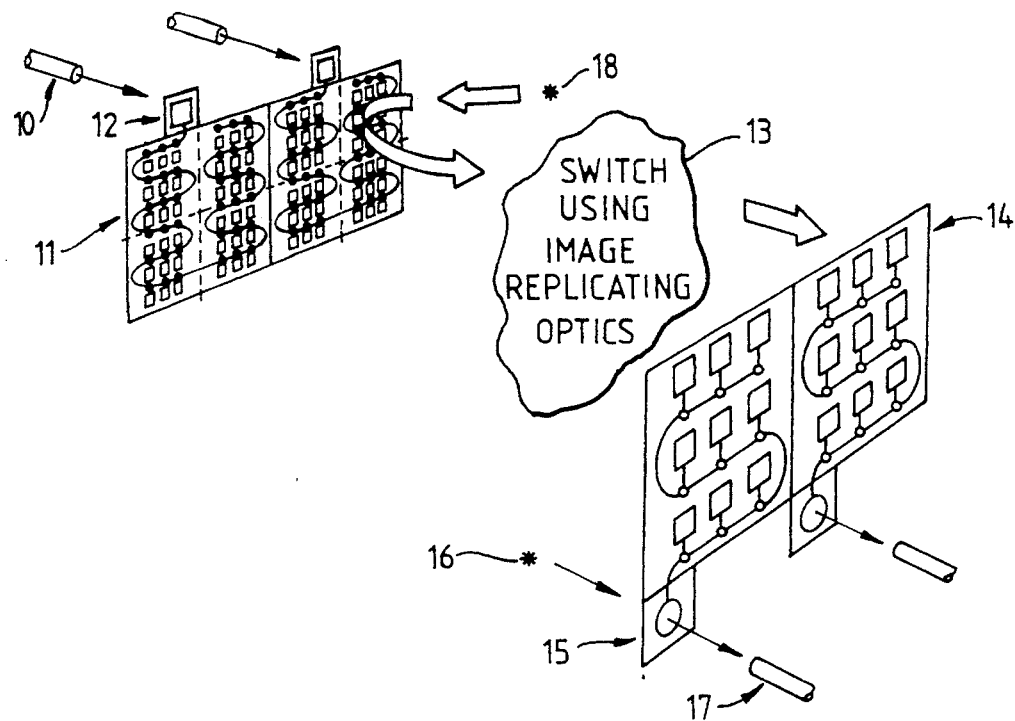
FIG. 1 is a schematic diagram of an optical packet switch.
Figure 3:
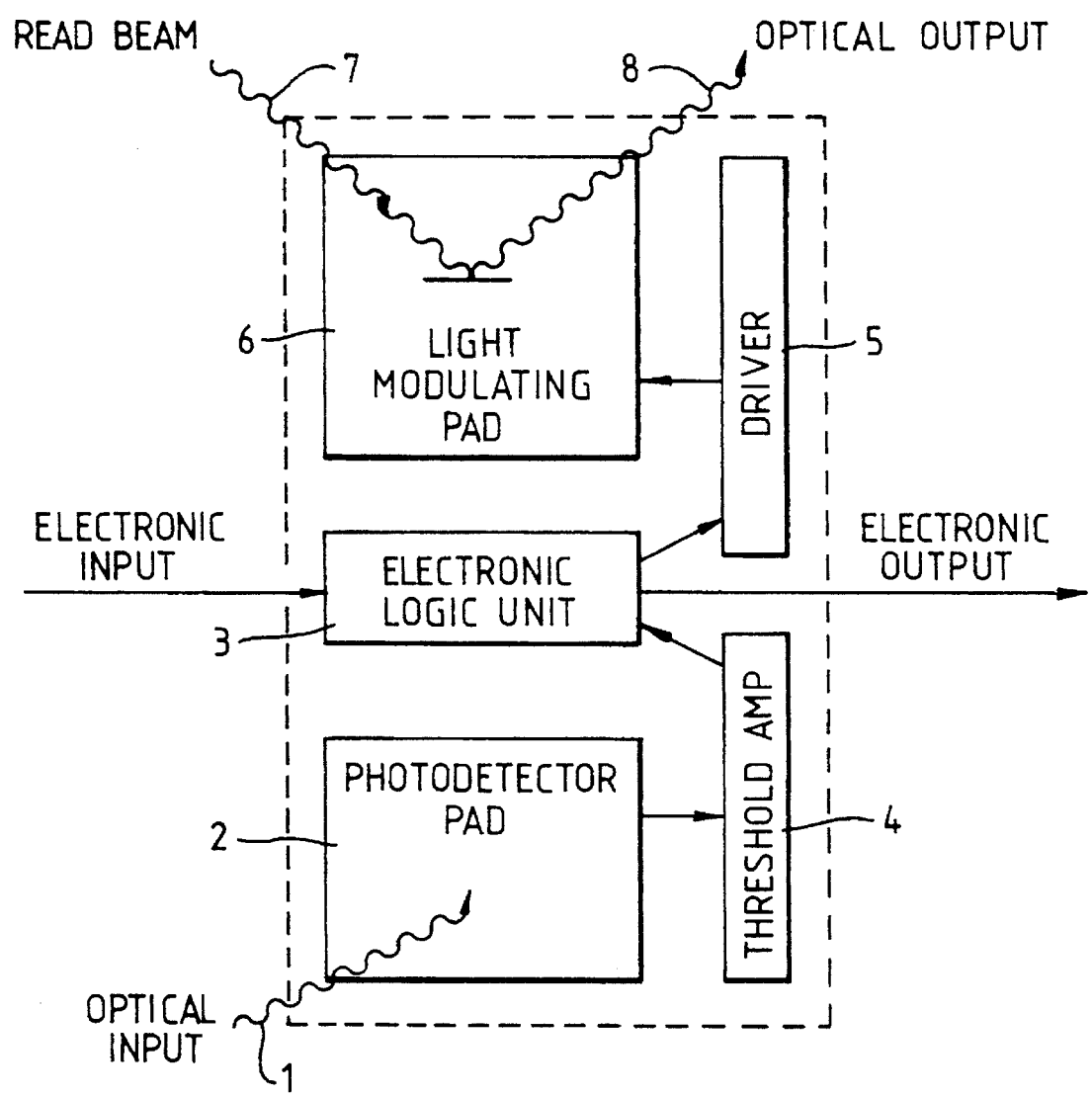
FIG. 3 illustrates a general case of a smart pixel.

The arrangement shown in FIG. 1 comprises a fast packet switch based on free space optics and spatial light modulators. In particular fast ferro electric liquid crystal integrated with silicon VLSI technology can be employed for the latter, see for example GB Application No. 90/3593.0 (Ser. No. 2233469A) (W A Crossland 57-9-1) which discusses various aspects of so-called smart pixels. FIG. 3 illustrates the general case of a smart pixel which as will be appreciated is a hybrid electro-optic arrangement. Depending on its function the smart pixel may not need all of the electronic inputs and outputs and the optical input can be very simple, such as in the case of optically accessed Random Access Memory (RAM) cells.

An optical input 1 applied to photodetector pad 2 serves to trigger an electronic logic unit 3 if it is above a predetermined threshold value set in threshold amplifier 4. The output of the logic unit 3 is applied to driver 5 which drives a light modulator pad 6 associated with a liquid crystal element (not shown) to change the state of the liquid crystal accordingly. A read beam 7 can thus result in an optical output 8 if the liquid crystal is in the appropriate state. A number of different technologies may be used to construct smart pixel arrays. Here, by way of example, there is discussed the use of smart spatial light modulators made by overlaying ferro electric liquid crystal layers over silicon VLSI die. This is called FELC/VLSI technology. (N Collings, W A Crossland, P J Ayliffe, D E Vass, I Underwood "Evolutionary development of advanced liquid crystal spatial light modulators" Appl. Opt 28, pp 4740–4747, 1989).

The packet switch of FIG. 1 comprises a time sequence interchanger and router switch using smart SLM (Spatial Light Modulator) input and output planes. The switch is shown for two fibres, four packets and a single wavelength and is by way of example only. Fast serial data as carried on input optical fibre 10 is taken from the time domain applied to a photodiode 12 and formatted into spatially arranged pages on a packet page formatter (PPF) 11. Each PPF spatially stores four packets from an input fibre. Each such page is then read by a read laser 18 and transmitted (switched) en bloc and in parallel using image replicating optics 13. The switched and replicated signals are directed to a packet page sequencer (PPS) 14 from which serial signals are derived to drive a respective modulator 15, whereby light output from a laser 16 is modulated prior to being input to an output fibre 17 in order to produce another serial data stream. Each PPS serialises a switched packet for an output fibre. Typically the modulator 15 is a multiquantum well device. The data formatting is illustrated using shift registers, which in practice may not be sufficiently efficient, however, this illustration is by way of example only and to indicate the principles of an optical packet switch. The planes comprising the formatter 11 and sequencer 14 may be considered as optically accessed memory i.e. as arrays of RAM cells, each provided with its own modulator pad so that blocks of data can be transferred intact through the reconfigurable optical interconnect (image replicating optics). In the electro-optic smart pixel implementation considered here there is no optical memory, this function being carried out in the electronic islands or pixels. The system of FIG. 1 may be likened in principle with an all-electronic system in which data is demultiplexed down, stored in RAM, rearranged and then multiplexed back up as necessary. From this viewpoint, optics is used to achieve very large pin outs in and out of the electronic memory. It also enables the rearrangement and replication of data packets to occur instantaneously, once the pattern has been set up, via the parallel optical interconnect switch.

Figure 2:
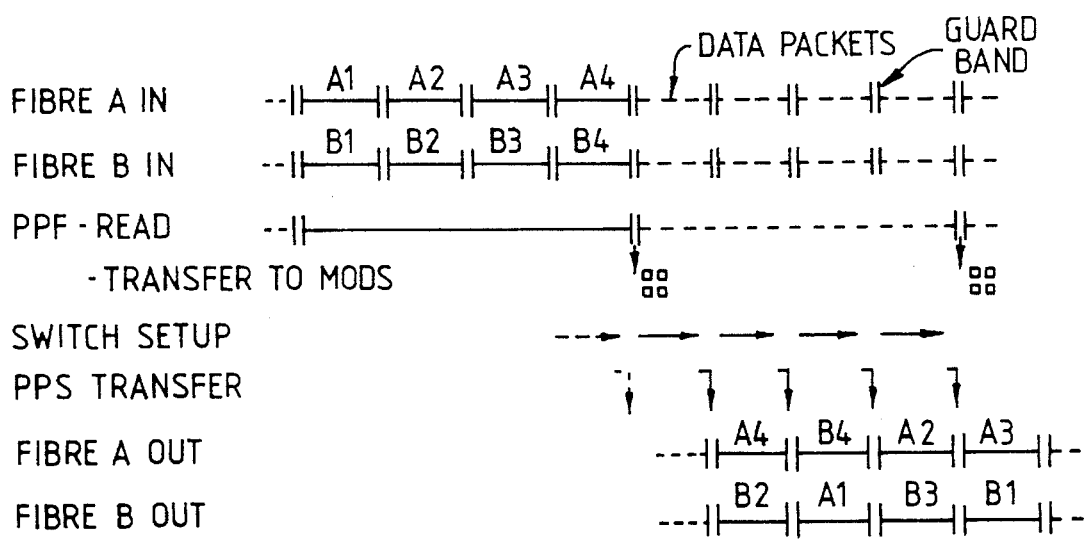
FIG. 2 is a timing diagram for the switch of FIG. 1.

A timing diagram for the arrangement of FIG. 1 is shown in FIG. 2 which illustrates the principles of both routing and time slot interchange. Two routing channels are shown along with time slot interchange between four cells. In general, ignoring any gains from wavelength coding and considering only gains from the spatial parallelism, the time T available to set up the optical switch is less than or equal to N times the packet or cell length. For the case of pure routing, N is the number of different packets stored on the input PPF. For time slot interchange, N is the number of replications of each different packet stored on the input PPF. Each PPF spatially stores 4 packets from an input fibre whereas each PPS serialises a switched packet for an output fibre.

Figure 4:
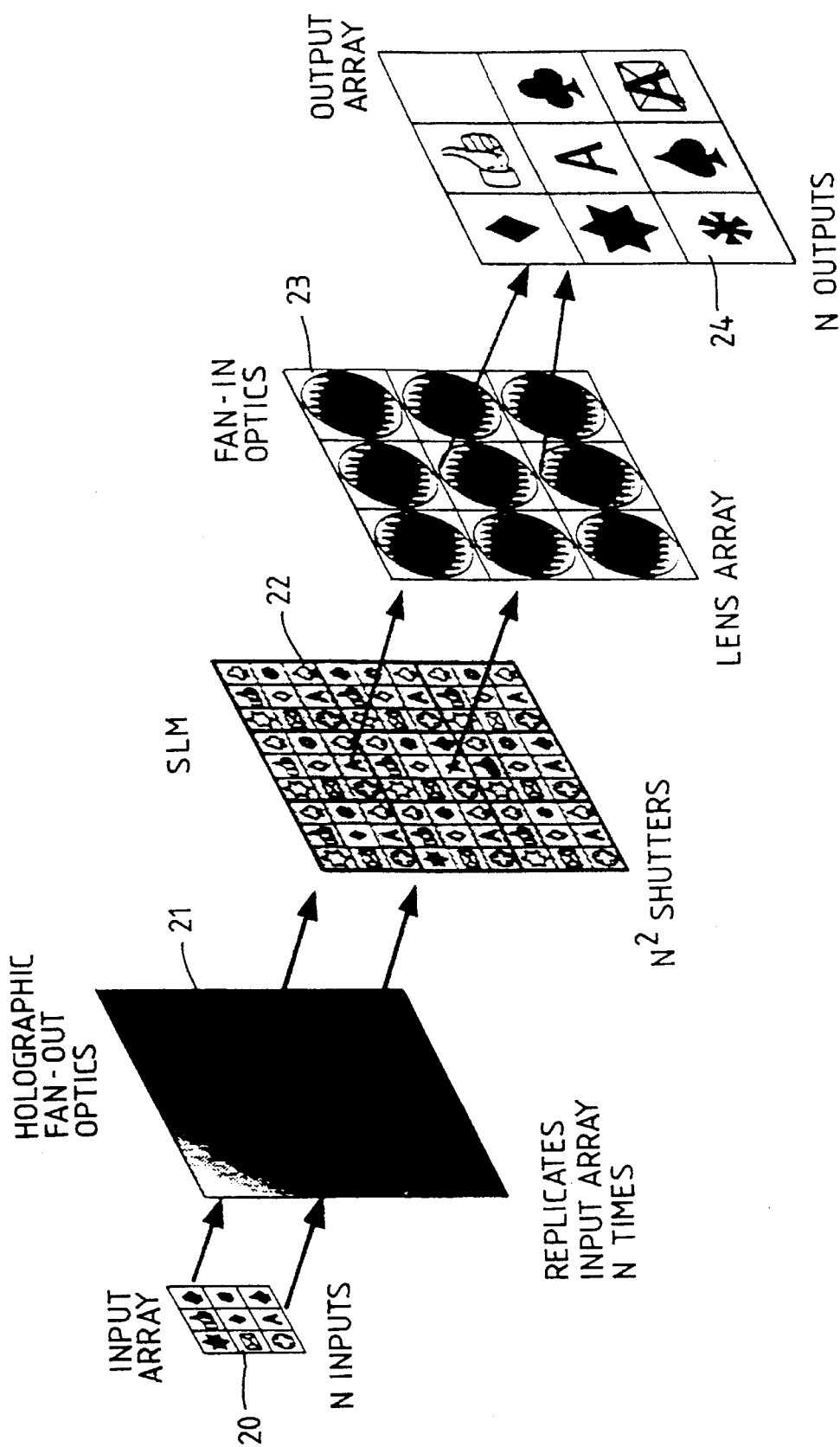
FIG. 4 illustrates an embodiment of image replicating optical switch for use in the packet switch of FIG. 1.

An example of an image replicating optical crossbar switch is illustrated in FIG. 4. The design shown schematically in FIG. 4 is a matrix-matrix multiplier switch. The diagram implies that it can switch data patterns, shown here as images, as well as single channels. The design also has advantages of efficiency over matrix-vector designs. The optical arrangement necessary is described in more detail in "A Compact and Scalable Free-Space Optical Crossbar" A G Kirk, W A Crossland, T J Hall, 3rd International Conference on Holographic Systems, Components and Applications, 16–18 September 1991, Edinburgh UK. The spatially distributed input information is represented by symbols. Holographic fan-out optics 21 replicates an input array 20 (PPF) with N inputs N times. The holographic fan-out may be comprised by use of parallel diffractive optics in partial Fourier plane array generators as discussed in the Kirk paper. Such an arrangement has the major property, referred to above, that it can handle images (blocks of data) rather than just single channels. A FELC SLM 22 with $N^2$ shutters comprising an FELC optical cross bar performs the routing (switching) as a result of the shutters being "open" or "closed" as appropriate, and a fan-in optic lens array 23 directs signals to the output array 24 (output page sequencer) for subsequent retransmission in serial form. [Optical crossbar switches are devices for connecting N inputs to one or more of N outputs and may include a crossbar matrix (spatial light modulator) which determines the routing of inputs to outputs. A matrix-vector optical crossbar switch is described in A R Dias, R F Kalman, J W Goodman, A A Sawchuck, "Fibre optical crossbar switch with broadcast capability" Opt. Eng. 27(11) pp 955–960, 1988. See also, for example, our GB Patent Application No. 90 10692.3 (Ser. No. 2243967A) (W A Crossland 58-1-1) which discusses various aspects and embodiments of optical crossbar switches based on the principle of the matrix vector multipliers. These principles also apply to matrix-matrix switches of the kind discussed here.]

The key components of packet switches described above are thus the smart pixel devices, the page formatters and page serialisers that form the input and output planes, and the SLM at the heart of the optical interconnect. They may all be envisaged as FELV/VLSI devices. Bit level processing (shifting) occurs within the electronic domain but within small electronic pixels or islands, whereas optics is used to switch the spatially paged information.

Figure 5:
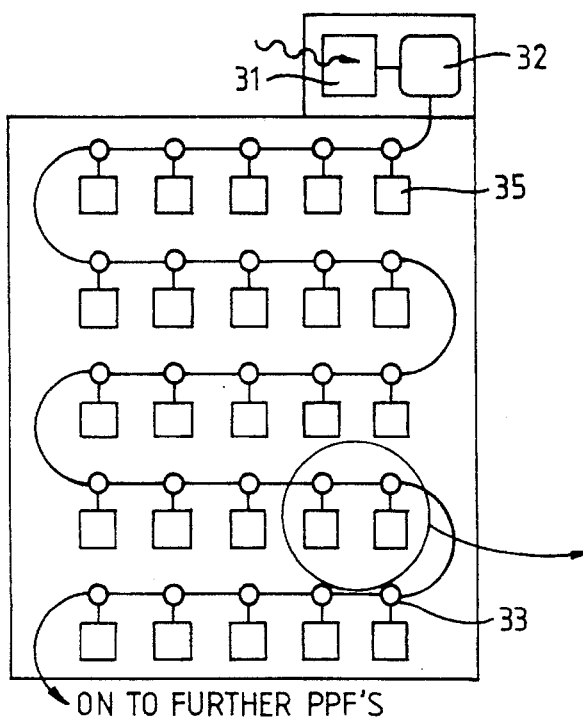
FIGS. 5 and 5a illustrate an input packet page formatter (PPF) for the packet switch of FIG. 1.
Figure 5A:
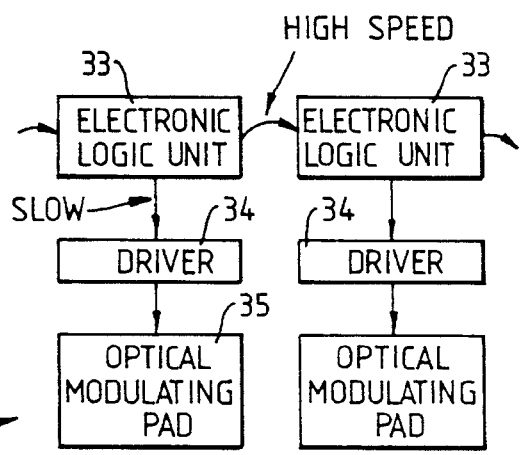

The input plane (PPF) is shown in further detail in FIGS. 5 and 5a. The arrangement functions as a very fast electronic shift register organised as a two dimensional page. Incoming serial optical data is received by photodiode 31 and corresponding electrical signals are fed via threshold and serialising logic 32 to a series arrangement of electronic logic elements 33 each having a respective driver 34 and optical modulating pads 35, as indicated in greater detail in FIG. 5a. Each stage of the shift register is itself a smart pixel with its own FELC optical modulator. No photodetectors are required at the pixel level on the PPF. The modulators do not have to operate at the bit rate but only at the slower page rate. There is high speed electrical transfer between logic units 33 at the full data rate but slow transfer from logic units 33 to the light modulating pad drivers 34 during the packet guard band. Large arrays of FELC/VLSI modulators can be made and the PPF typically may comprise (MOS VLSI back planes integrated with liquid crystal technology, although alternatively the back plane could be fabricated using fast bipolar-silicon technology. Each logic unit 33 of FIG. 5 may include more than one memory cell to facilitate simultaneous read-in and read-out of data (as shown in FIG. 15).

Figure 6:
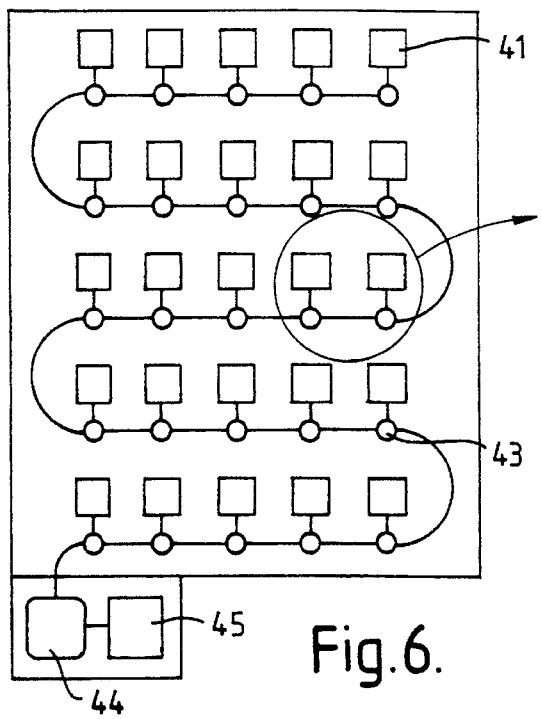
FIGS. 6 and 6a illustrate an output packet page sequencer (PPS) for the packet switch of FIG. 1.
Figure 6A:
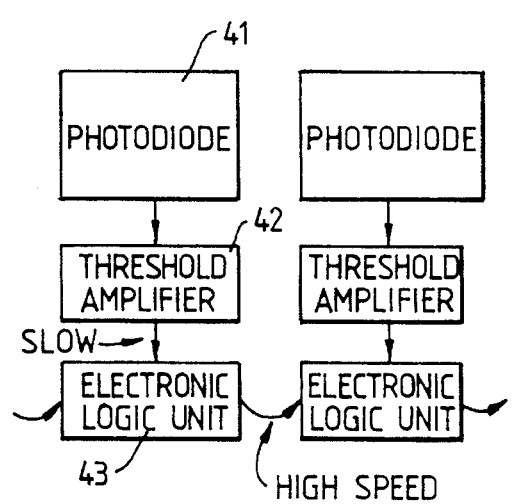

The output plane (PPS) of FIGS. 6 and 6a reverses the procedure of the input plane and carries out a parallel to serial conversion using a shift register structure in which each stage has an associated photodetector 41 to read the incoming data image, a threshold amplifier 42 and an electronic logic unit 43. There is slow transfer of threshold data to the units 43 but high speed electrical transfer between units 43 at the full data rate. The sequential data output is fed via control logic 44 to a MQW modulator 45 which is used as described above. Advantageously BiCMOS technology is employed for the fast silicon backplane structure, since bipolar technology is required for fast shift registers and the CMOS processing allows photodetectors to be integrated into smart pixel arrays.

The switch described above is a fast packet switch based on FELC/VLSI technology. The same basic principle of replication or broadcasting of incoming information from each incoming switch port to all outgoing switch ports can, for example, be employed to achieve a switch capable of interfacing with transmission networks using the synchronous digital hierarchy (SDH) that can switch multiple links running at the basic 155 Mbit/s SDH rate (STM-1) using synchronous and asynchronous time division (STD and ATD) techniques.

Existing digital networks contain synchronous digital switches working in Synchronous Transfer Mode (STM) and the information switched is then of fixed length and at a fixed rate (125 microseconds per frame). Paths across the network are reserved and occupied for the duration of a transaction. The SDH can carry ATM (Asynchronous Transfer Mode) cells and this enables information to be sent at a variable bit rate by varying the number of cells transmitted on a given virtual channel. While the route across the network is fixed, only an allowance for the occupancy of a virtual channel is made and physical channels can be pooled and shared by different transactions. Peaks in traffic can therefore cause temporary blocking and provision has to be made for holding the less urgent traffic at nodes in the network and hence operating in a store and forward mode.

From the point of view of routing traffic, the advantage of SDH is that it enables containers to be multiplexed and demultiplexed independently from the rest of the multiplexer content and this makes a drop and insert function feasible in situations where complete demultiplexing is not required. From the switching point of view it means that demultiplexed traffic can be steered into switch memory as a contiguous block.

In conventional STM switching (TST, Time-Space-Time) incoming traffic at a nominal 2 Mbit/s rate is read into a memory in arrival order. The combined memory for a number, N, of 2 Mbit/s links is the first time stage. Traffic is switched to the output time stage and written into a memory associated with the relevant output link by a space stage that is time divided. The space stage consists of a highway B bits wide running at a bit rate of P bit/s. The bit rate on the highway is:

$$P=2N/B\ Mbit/s$$

and the number of switch crosspoints for a single non-blocking square switch matrix is $$C=(NB)^2$$

however, in practice a multi-stage space switching network might well be used.

When dealing with speech traffic it is convenient to make B=8. Then if P=100 Mbit/s, then N=400 and C=$10^7$. This corresponds to the concentrated speech from some 50,000 customers. Thus in terms of speech traffic there is no problem in designing a TST switch capable of performing the function of a large local exchange. Problems, however, begin to arise when P becomes much greater than 100 Mbit/s, and this is an issue addressed hereinafter.

As mentioned above, the ATMOSPHERIC switch works in a combined STM-ATM environment with separate switch blocks for STM and ATM traffic. For ATM, space switching is by a multi-stage non self routed network and the store and forward function is implemented by content addressable memories on the input side of the switch. The STM switch is STS (Space-time-Space) and the space stages are time multiplexed. The switch contains a gateway or translation function between the STM and ATM environments.

It is proposed here to use a TST switch and to make the time stages electronic and the space stage optical, hence an Electronic Time—Optical Space—Electronic Time (ETOSET) switch. Liquid crystal technology (FELC/VLSI) is used to provide an optical interface to memory, which is the basis of the space switching operation. This is a more general case to that of the packet switch considered above and comprises a combination of a packet switch and a circuit switch for local and trunk traffic. In these suggestions optics is used to aid electronic switching by providing highly parallel reconfigurable interconnection paths.

The requirements for an ETOSET switch will now be discussed.

The following assumptions are made:

(1) A combined STM-ATM environment (Synchronous Transfer Mode—Asynchronous Transfer Mode).

(2) A transit switching function with local access.

(3) The transmission interface is an M STM-1 system. This might consist of a higher order STM-M multiplex in which case all the information would be frame synchronised or it might consist of a number of separate multiplexes of order less than STM-M originating at different places for which frames would not be in synchronism. In any event, demultiplexing (disassembly) to the STM-1 (155 Mbit/s level is assumed at the switch interface.

The essence of the switching operation is to (a) Demultiplex incoming containers and reassemble then as "switchable entities" (SE) in a form suitable for conveyance to a destination within the switch.

(b) Convey the SEs to their destination port.

(c) At the destination port remultiplex or otherwise process the SEs for dispatch.

The simplest "switch" is a memory into which the incoming links write their containers as SEs and the outgoing links pick out what they want for their own purposes and ignore the rest. The problem with this is contention for memory access. Whilst the incoming links can be assigned their own memory sectors so that they do not contend with each other, the outgoing links need to access memory at random, leading to contention. If R is the incoming data rate per link and access is in terms of octets, the write rate on input is R/8, while the read rate on output is R*M/8.

Figure 7A:
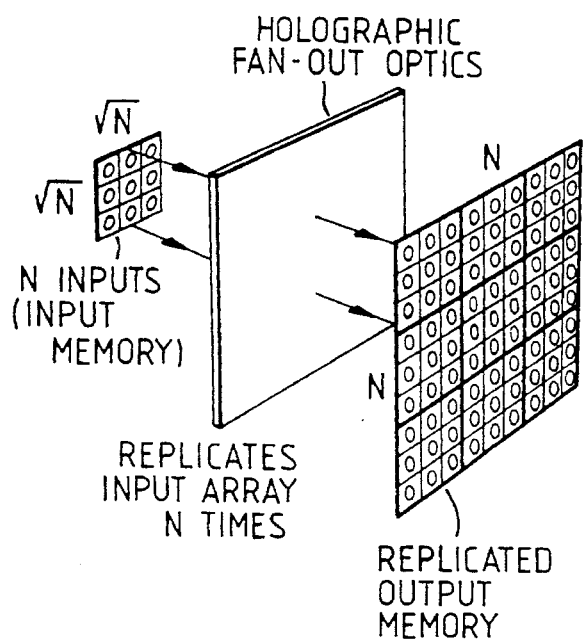
FIGS. 7a and 7b illustrate schematic diagrams for an Optical Space switch, ETOSET (Simple Replication) and ETOSET (Assigned Input Memory) respectively.

The difficulty can be overcome if the incoming links write their containers into their own sectors of memory and then the total memory is copied en bloc and M-fold to each of the M output links. All that is needed is a means of replicating the input memory and the FELC/VLSI technology provides an optical means of doing this. One such means is shown in FIG. 7a (ETOSET—simple replication). Note that no shutters are required because the input memory is replicated redundantly and selection of what is wanted from it is made once this has happened. There is no need to specify or quantise the SE size. The output read rate is R/8.

Clearly the disadvantage if this approach, referred to as Simple Replication (SR), is that it is wasteful of memory. It is, on the other hand making use of the power of optical interconnects to transfer large amounts of data in parallel.

Figure 7B:
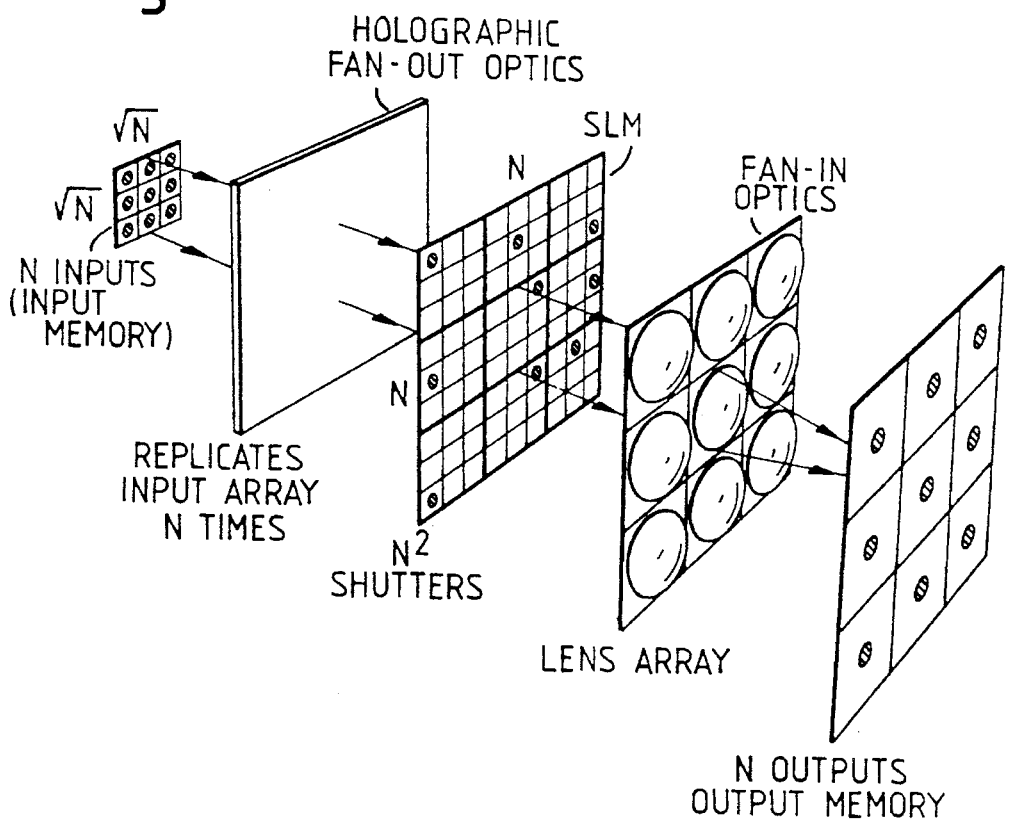

When shutters are used, as shown in FIG. 7b, a key issue is the level in the multiplex hierarchy at which space switching is to take place i.e. the SE size and hence the shutter size. First of all there is no question but that switching has to take place at the ATM packet level which means in blocks of 48 bytes, or perhaps 53 bytes depending on how the packet path overhead (POH) is handled. On the assumption that error control is link-by-link rather than end-to-end, the POH could be removed at reception and reinserted on transmission and it will be assumed for simplicity in the following that it is 48 bytes that is switched. The second question is the level at which conventionally multiplexed data (e.g. 64 kbit/s circuits) are switched. The choice lies between 64 kbit/s, 2.048 Mbit/s and a multiple of the latter. Multiples of 2.048 Mbit/s can be handled by switching several 2.048 Mbit/s paths in parallel and the real choice that has to be made is between 64 kbit/s and 2.048 Mbit/s. There are cases where all the channels in a 2.048 Mbit/s data stream will need to be switched to the same destination, and there are cases where they would need to be switched up to 30 different destinations. There can be of the order of 2000 64 kbit/s channels in an STM-1 multiplex alone and it is presently considered unlikely that an optical switch could be built with a resolution capable of handling M times that number of channels. The 64 2.048 Mbit/s systems are, however, a rather more feasible proposition so that this situation is taken as the starting point for the following. The selected parameters (numbers) are by way of example only. The same principles apply for other choices.

Thus we need to switch packets in blocks of 48 bytes and speech in blocks of 32 bytes. The highest common factor of these is 16 so the basic granularity of the switch is 16 bytes, or 128 bits, and this is the SE size.

Figure 8:
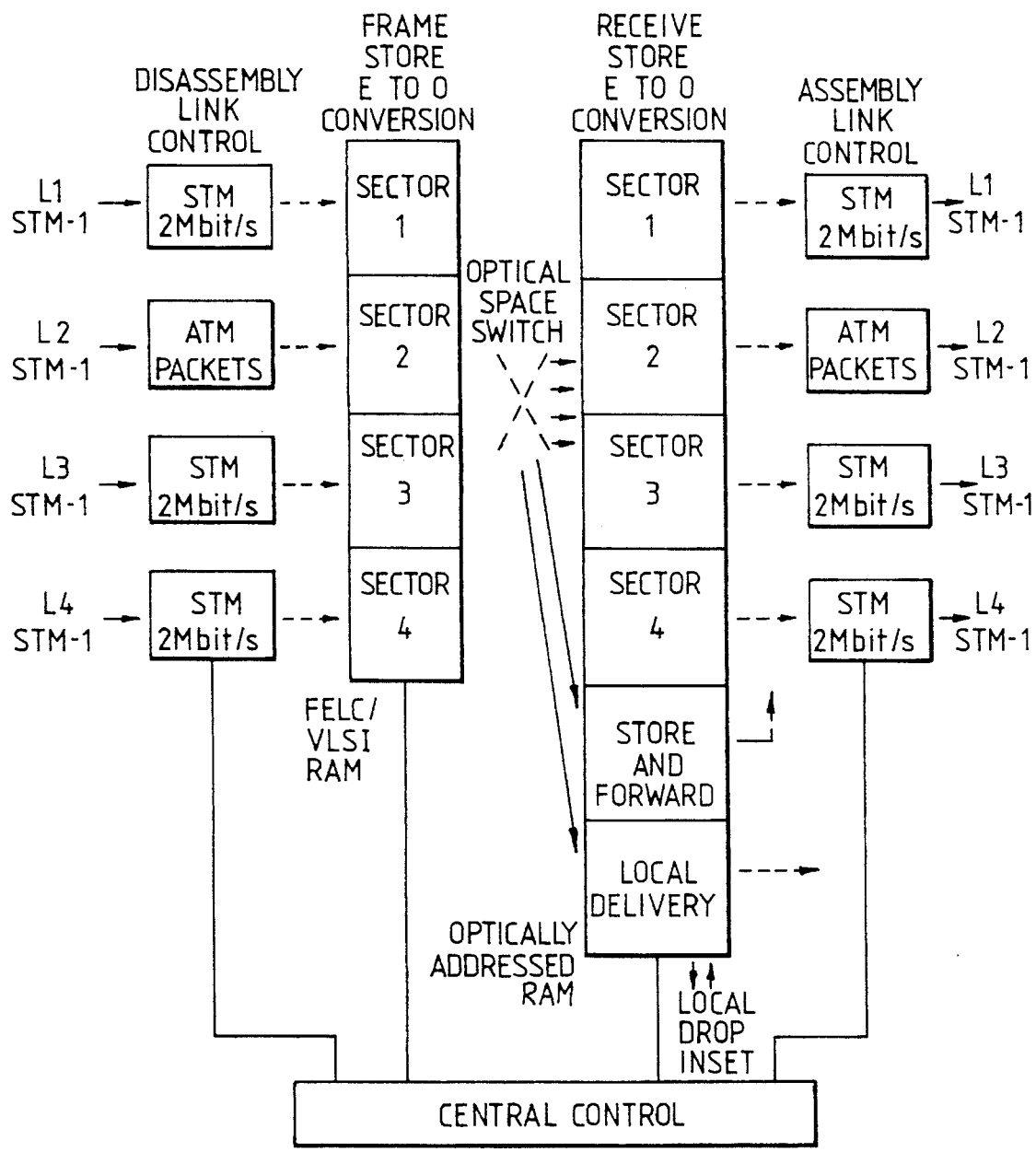
FIG. 8 illustrates schematically an ETOSET switch.

A block diagram of an embodiment of ETOSET switch is shown in FIG. 8. For the purposes of the embodiment it is assumed that an incoming STM-N (N=1 to 16) system is demultiplexed down to M STM-1 levels, M being four as illustrated, hence there are four levels L1, L2, L3 and L4. Each STM1 system is treated as one sector of the switch.

The number of ways that the switch can switch is M+2 because in addition to the M outgoing link sectors for transit switching there is a store and forward sector for packet switching and a local delivery sector for local traffic. Actually only M output memory blocks are required, as will be apparent from revised structure (FIG. 14) discussed in the following, whilst still enabling these extra functions to be achieved. Packets can be (a) switched straight through to an outgoing link sector, (b) switched into a store and forward sector, or (c) switched to a local delivery sector for local distribution.

The store and forward sector contains queues in which packets can be stored awaiting a free slot in an outgoing STM-1. It should be noted that the size of the outgoing memory needs to be sufficient to hold these queues, but as data arrives it can be shifted out of the photosensitive memory area into conventional RAM. The total number of shutters is 64 * 2 * M * (M+2).

The local delivery sector is for 2.048 Mbit/s systems that need to be broken down to the 64 kbit/s level. Once received the 64 kbit/s channels are handled in separate and conventional 64 kbit/s switches and/or multiplexers.

The ETOSET switch of FIG. 8 has an input plane store (Frame store E to O (electronic to optic) conversion) consisting of an array of FELC/VLSI modulators as described above with reference to the packet switch but loading of the memory is in a normal parallel (RAM) mode rather than by a shift register.

Figure 9A:
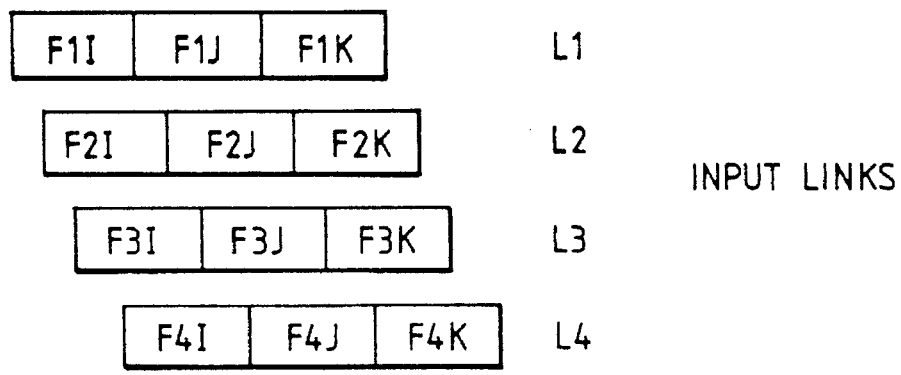
FIGS. 9a and 9b indicate link timing and memory timing, respectively.
Figure 9B:
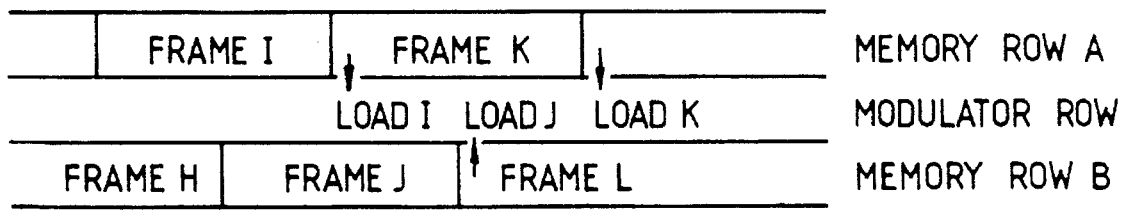

Each modulator store element is combined with the frame store that it required to achieve the retiming necessary in any digital switch with unsynchronised inputs. FIG. 9a shows the timing diagram. Note that incoming link frames are randomly related in time whereas outgoing link frames are synchronised locally. It is necessary to delay traffic by a maximum of 250 microseconds plus the time, $\Delta t$, to switch the traffic across the switch. Alternate frames are loaded into alternative rows A and B of the frame store (FIG. 9b) and when a frame is complete it is transferred every 125 microseconds in one parallel operation into the modulator (FELC/VLSI) memory row. Thus each pixel in memory requires three bits, only one of which is connected to the liquid crystal display pad. If all the incoming links are frame synchronised, for example, they come from one high order input multiplex, then it is only necessary to provide storage to buffer $\Delta t$ worth of incoming data and the buffer storage requirement is much reduced.

The optical space switch design (as outlined in FIG. 7) depends on which of the alternatives discussed above is adopted. It can range in complexity from the arrangement described for the packet switch to the SR design described above.

The output plane store (received store O to E (optical to electronic) conversion) consists of photodetectors and memory cells as described with reference to the packet switch but again organised as conventional RAM rather than in serial shift register mode.

FIG. 10a shows the input plane for a simplified situation where there are four incoming STM-1 links, or the equivalent, and each link has a payload of six tributaries, each of which is put into the appropriate number of cells and is to be switched as an entity. The destination of each cell-set is indicated in the figure and the incoming tributaries are loaded into the input memory in any order. An order that is a direct mapping of their position in the SDM multiplex may be convenient, however the packet traffic could be segregated from the rest.

FIG. 10b shows two links in the output plane of the switch. In total, the output plane has M+2 times the memory cells for the input plane. The designation in the boxes indicate which incoming link the output cell information has come from. Clearly there is a lot of redundant storage because at any instant in time only a fraction of the output storage is occupied. With this arrangement no fan-in optics is required, but there are shutters, and the output memory can be placed at the SLM shutter plane. The output traffic order in store does not bear any relationship to the order in which it is required to be transmitted on the output link. However with parallel read-out from the output store this is not a problem.

In theory each output link needs only one sector's worth of storage whilst with the above arrangement it needs M-1 sectors (it would be M if traffic were to be returned on the link it came by—which could be the case for test traffic) and it is necessary to consider a design in which all the outgoing link traffic is overlaid by fan-in optics on a one sector output store. However from consideration of FIG. 10a it is apparent that some of the traffic from links 1 and 2 destined for links 3 and 4 would be switched to the same locations in memory. To avoid this difficulty the input traffic has to be arranged in an order that prevents clashes and two cases can be considered:

(a) Where the incoming traffic on a link is no longer confined to one sector of the input store and is written to any location using a first no-clash algorithm.

(b) Where the incoming traffic is segregated in the input store but written using a second no-clash algorithm.

For case (a) a rearrangement algorithm is not too complex, particularly if the cells are of equal size but is more complicated if the cells are of unequal size and if there is packet traffic. The order in which output traffic is stored bears no relationship to the order in which it is required to be multiplexed on the output link. There is a fundamental snag with this arrangement because if one can arrange input traffic into output link order with no constraints then the switching has already been done and there is no need for an optical switch at all. However one has the memory contention problem that was pointed out earlier. Sorting the input traffic into output order involves just the speed operations that an optical switch is endeavouring to avoid.

For case (b) the algorithm looks to be rather more complicated or at least time consuming in that it is likely to be iterative in nature and involve re-arrangement as new traffic is generated. FIG. 11 shows the principle, each input link is assigned areas for output traffic and none of these assigned areas overlap. This is acceptable if the traffic is balanced but if link 1, say, has a lot of traffic for link 3, the link 1 assigned area (row 2) may overflow and there will be a need to "borrow" from another assigned area. Any borrowing involves checking all the other links to avoid clashes. The knock-on effects can be reduced if there is surplus memory both on the input and output sides and in fact FIG. 11 has already allowed surplus memory in assigning a row each to store and forward (S&F) and local switching (LOC) as well as the output links. The arrangement in which input memory is assigned, there are shutters and the optical switch takes the form shown in FIG. 7b, is called ETOSET/AIM (AIM for Assigned input memory).

With ETOSET/SR (SR for simple replication) the optical space switch in FIG. 8 corresponds to FIG. 7a.

Choice between SR and AIM depends on the relative cost of memory and optics and on the practicality of the no-clash algorithm with AIM. SR might appear to be cheaper and is certainly simpler.

So far it has been assumed that there is one cross-office transfer every 125 microseconds but this is not the only possibility. Transfer of half the data every 62.5 microseconds or a lower submultiple are clearly other options.

Whereas memory replication by optical means has so far been discussed there is an analoguous all-electronic solution to the switching function i.e. memory replication. This is referred to hereinafter as SER (Simple Electronic Replication) and is described below with reference to FIG. 12, which shows four incoming links (L1, L2, L3, L4) at the STM-1 level and is a minimal configuration for explanatory purposes. The output of each incoming link is copied four-fold into a dedicated area of each output store. Each of the four output stores is partitioned so that writing can take place independently to each sector of its four sectors. The block marked Dxy (x=1 to 4, y=1 to 4) takes the incoming serial bit stream from incoming link x, removes address/header information and converts data into a parallel octet format and writes it all into the memory block Mxy. The address information relevant to the outgoing link, y, is written into the dedicated area of memory block Mxy. The read-out block Ry reads the address information in each of the associated memory block's four sectors and determines which of the content of the memory block is for output on link y. The relevant content of the output store is then read out in line required order and transmitted on the outgoing link. Data that is not intended for link y is ignored.

Writing all the data into a memory block whether the data is wanted for output on that link or not is inefficient in terms of memory block size, particularly so if the traffic is evenly balanced between links. However, there may well be situations where the majority of traffic on an incoming link P is destined for outgoing link Q and the design will cope with that. If one can be assured that traffic is well balanced, then consideration can be given to discarding traffic before writing into memory, with consequent reduction in memory size.

The read out block Ry is also responsible for drop and insert for local traffic. For a given two-way circuit the drop operation is handled for the incoming channel by the Ry block that provides the insertion operation for the outgoing channel.

In the event that an outgoing link temporarily overloads, data is read from the incoming area of memory Mxy into a queue area and kept there until the outgoing link has spare capacity.

When the incoming information is not in the format required for a given outgoing link, reformatting can take place as part of the outgoing assembly procedure e.g. primary rate to ATM gateway mode; primary rate to ATM—transparent mode; STM-1 to ATM gateway mode; STM-1 to ATM current mode. Note that only one switching operation is required whereas in some cases ATMOSPHERIC requires two such operations. Note too that because these operations take place on a per link basis rather than centrally as in ATMOSPHERIC they are independent of the total switch throughout.

Figure 12:
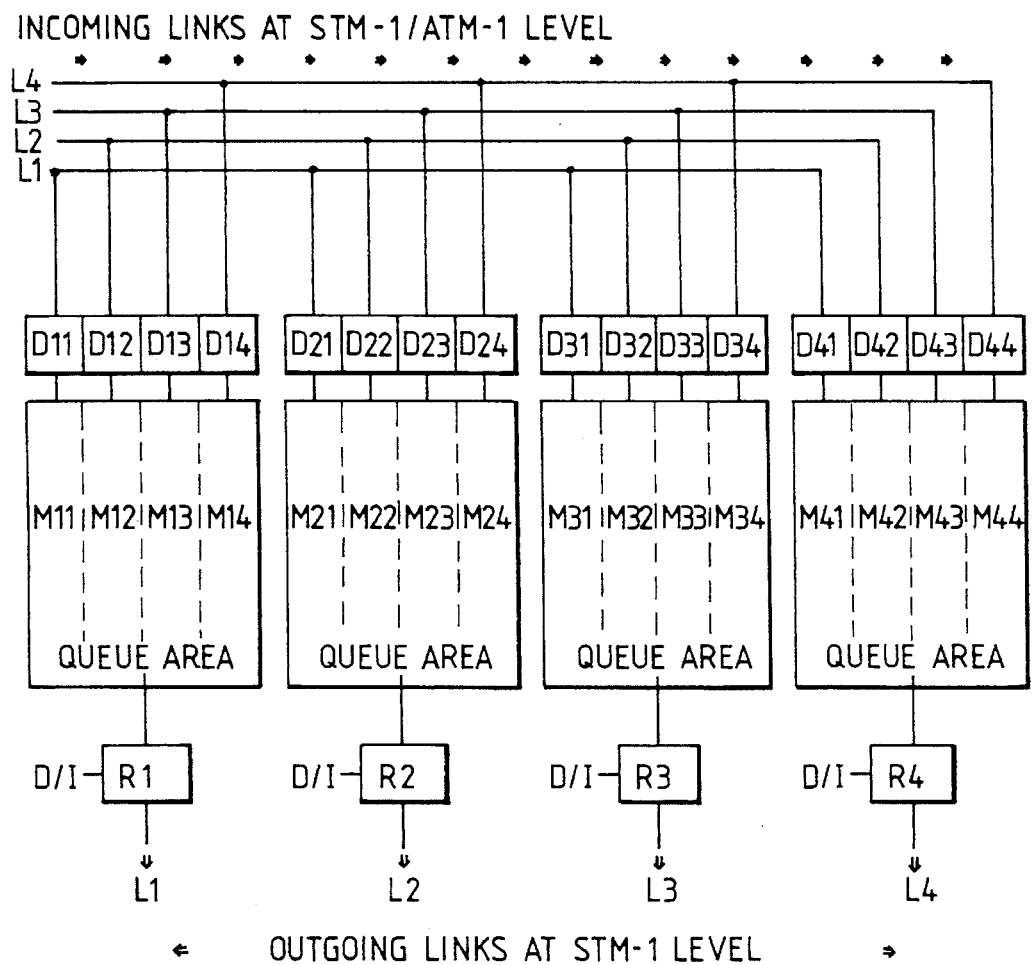
FIG. 12 illustrates schematically a SER switch and in particular indicates broadcast to replicated memory.
Figure 13:
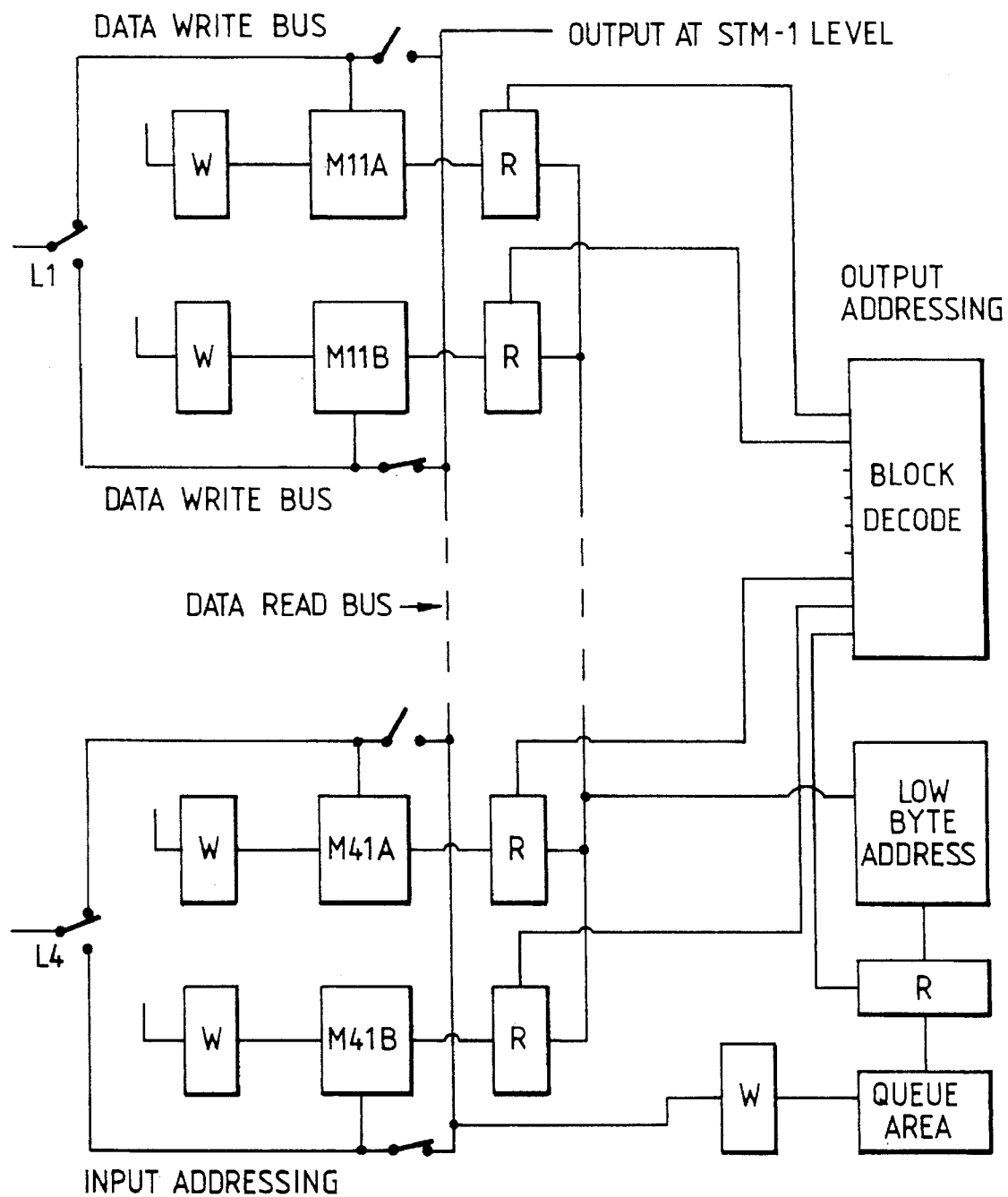
FIG. 13 illustrates the internal organisation of a memory block.

FIG. 13 shows by way of example and in greater detail the organisation of the first of the memory blocks of FIG. 12. The sector M11 is divided into two sub-sections M11A and M11B which are alternately written and read. This duplication is necessary for rephasing the output when the incoming links are not frame synchronised. This is similar to the ETOSET arrangement except that storage is duplicated rather than triplicated because there is no need here, as there is in the optical solution, to transfer information from storage cells to the read-out cells.

Once an end-to-end connection is established the control is on a per link basis insofar as all the necessary information to sustain the connection is contained within the SDH multiplex. There is a central control module which is used to set up calls and to handle management information but this is not shown in FIG. 12.

If the storage requirement at the STM-1 level is B bits and there are M STM-1 systems, then the storage requirements for the optical solution is $(3BM+BM^2)$ and for the electronic solution is $2BM^2$. For M=4, the optical solution requires 28 B bits and the electronic solution requires 32 B bits. For M=16, the optical solution requires 304 B bits and the electronic solution requires 512 B bits.

Returning to FIG. 13, it will be seen that incoming information is written to block M11A while output information is read from block M11B. The blocks marked W and R are the write and read address decoders respectively and are shown separately for clarity but in practice can share circuitry. Only the outgoing data in M11B relevant to L1 is read. A queue area is shown in FIG. 13 for the store and forward function and this area could be shared between all of the M×1 memory block, although the arrangements necessary for sharing are not shown.

In terms of blocks of memory that need to be capable of being addressed individually, the optical solution requires 2M+M and the electronic solution requires $2M^2$. For M=4, this means 12 for the optical solution and 32 for the electronic. For M=16, the figures are 48 and 512 respectively.

The major advantages of SER over knockout/Gauss are an ability to cope with a mixed ATM/STM environment and a design that needs to make minimum assumptions about traffic situations (i.e. only for the dimensioning of internal queues). In a totally ATM environment, the Knockout/Gauss approaches would be preferable.

SER and ATMOSPHERIC are both designs that attempt to switch traffic in a mixed ATM/STM environment, although as mentioned above ATMOSPHERIC has separate ATM and STM sections. In a comparison between SER and ATMOSPHERIC, SER is believed to have clear advantages in respect of modularity, simplicity, traffic independence and distribution of control.

From the SER arrangement described above it is clear that the ETOSET arrangement previously described can be revised. FIG. 14 illustrates the revised ETOSET configuration. It differs from the original version in that:

(a) Once a path is established the connection information is conveyed by the switch in an analogous manner to that proposed for SER. (The central control module which is concerned with path establishment and management is not shown in FIG. 14).

(b) There is no longer a separate store and forward module or local delivery module. Store and forward is handled on a per-link basis in the same way as proposed for SER. Drop and insert is handled similarly.

Figure 15A:
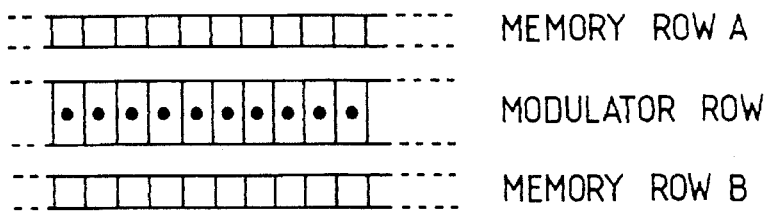
FIGS. 15a and 15b illustrate source memory organisation for a parallel read-out and serial read-out, respectively.
Figure 15B:
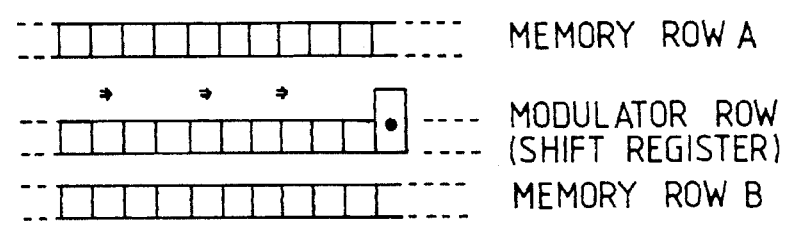

FIG. 15a shows the source memory organisation as proposed above and parallel read-out and FIG. 15b suggests an alternative serial transfer arrangement for the destination memory. The serial arrangement needs 1/nth of the modulator cells of the parallel arrangement, where n is the number of bits serially shifted per frame. Because the number of modulator cells is the major factor in determining the silicon area for the source memory, the serial arrangement requires a lot less silicon. However, if t is switching time of the modulator, the latency of the switch increases by nt. In any event nt must be less than 125 microseconds. The arrangement of FIG. 15b is such that the destination memory will need fewer photodetectors and a shift register input. Because the photodetectors in the destination memory are much faster than the modulators in the source memory, the source memory is the determining factor as far as speed is concerned.

Of the arrangements described above SER and ETOSET/SR use memory fairly lavishly but are non-blocking switches whatever the traffic level. ETOSET/AIM needs to be non-blocking if it is to show any advantage compared to ETOSET/SR. The question thus arises of the possibility of making worthwhile memory savings for the non-blocking designs and subsequent comparison of the two ETOSET versions.

We will first consider ETOSET/SR. In the basic design each incoming link is assigned a sector of the input memory and addresses it sequentially in incoming data order. By assigning sub-sectors (or assembly areas) in input memory to specific outgoing links and addressing them according to the destination of the incoming data, it is possible to reduce the size of the output stores, which now need to be the size of the assembly areas rather than the total input memory. The key question—from traffic considerations—is how big do these assembly areas need to be?

Figure 16:
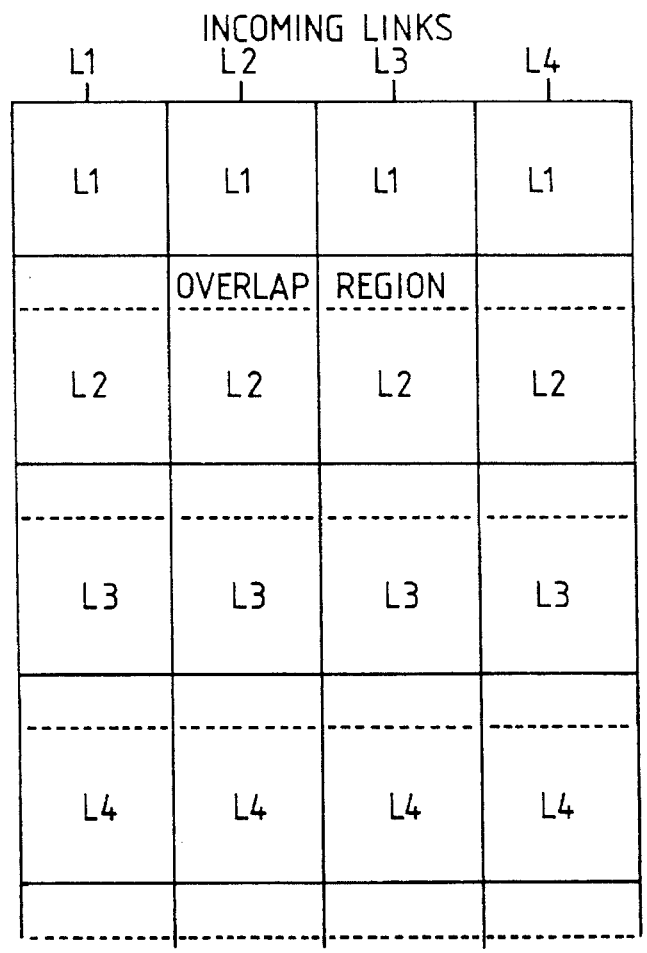
FIG. 16 illustrates memory assignment for an input memory.

Consider the arrangement of FIG. 16. The partitioning into areas designed for specific output links is indicated by a solid line for the start of a segment and a dashed line for the end of a segment. There are overlap regions which can be shared, or assigned dynamically, to the "upper" or "lower" output link. The size of the output memory is the width of the diagram times the height between the uppermost solid line and the lowermost dashed line. Clearly any memory saving achieved with such a arrangement is dependent on the vertical dimension of each segment. It should be noted that the total vertical dimension can be considerably in excess of that required for the non-blocking arrangement and hence savings in output memory must more than offset increase in input memory. In situations where there is a large potential "community of interest", an example of this being the subscribers to a virtual private network, the size of each segment becomes large and in fact the total memory requirement can increase rather than diminish.

One way out of this difficulty is to "shuffle" the input. This balances the traffic much more evenly between the horizontal areas of memory assigned to a given output segment. The arrangement then becomes that of FIG. 17, where each strip of memory has the capacity of one link frame, say B bits, plus a factor that represents traffic fluctuations, both output link fluctuations and fluctuations-in the input distribution i.e. allowing for the fact that the shifting process is a statistical one.

The input memory requirement is:

$$M_{is} = R_i*(B+\sigma)*N \quad (1)$$

where

R_i=replication factor for input memory 3 for ETOSET)
σ=traffic fluctuation allowance in bits per sector
N =number of links The output storage requirement is:

$$M_{os} = R_o*(B+\sigma)*N \quad (2)$$

where

R_o=replication factor for output memory (1 for ETOSET)

This compares with the basic design where the memory requirements are:

$$M_i = R_i*B*N \quad (3)$$

$$M_o = R_o*B*N^2 \quad (4)$$

for the input and output memory respectively.

Figures 17, 18:
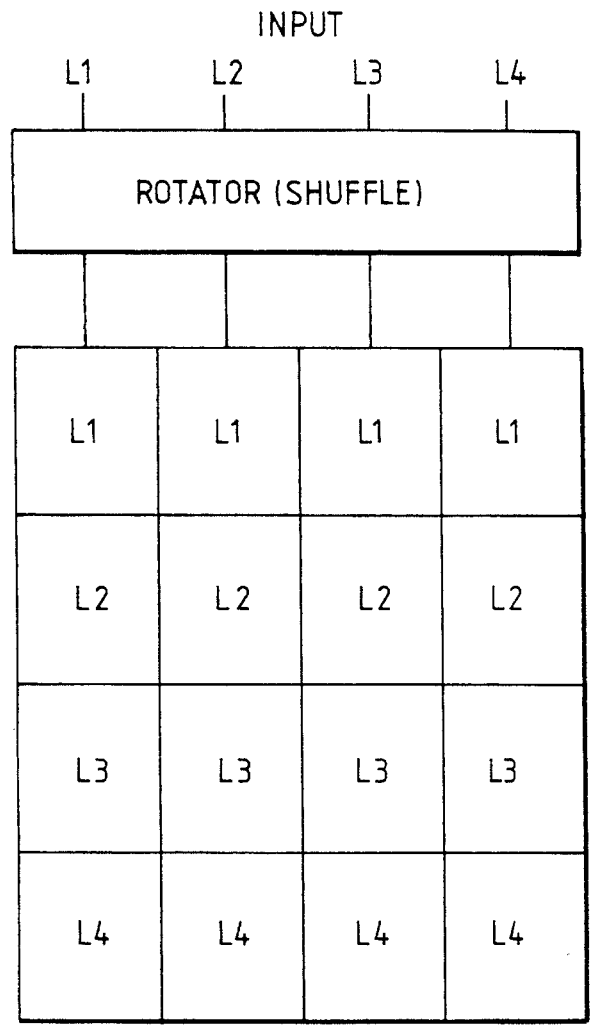
FIG. 17 illustrates memory assignment for an input memory after shuffling.
FIG. 18 is a table comparing ETOSET memory requirements without and with a shuffle.

The table shown in FIG. 18 compares the memory requirements for the two situations in units of B. Bearing in mind that B is of the order of 18–19 kbit, with values of N 8 or greater the savings are very significant. The number of crosspoints in the shuffle is based on a two stage network as described in "A rotating access switch" M E Beshai, E A Munter, Queuing Performance and Control in ATM (ITC-13). J Cohen and D Pack (eds). Elsevier Science Publications B.V. 1991, pp 53058, and assumed transfer through the shuffle is in serial mode. Because the crosspoints are driven in a fixed sequence, they can be controlled by sets of circulating shift registers with one bit set in each register and there is then only one storage bit per crosspoint. Even allowing for the fact that special circuits are required to initialise these shift registers, it is unlikely that the cost of shuffle would approach the cost of the extra memory required in the case where no shuffle is used. Serial to parallel conversion would take place at the shuffle to input memory interface.

The rotating access ATM switch according to Beshai and Munter is for fixed length ATM cells only, whereas ETOSET was intended for a mixture of STM and ATM traffic. As a result of this there is a question as to the rate of shuffle for ETOSET. It could be at the octet rate, the cell rate (i.e. a six octet rate assuming the cell header is removed) or switch between rates according to the traffic patterns. The latter is considered impractical because different links will have different traffic patterns at any one time. If the octet rate is adopted, ATM cells will cease to be contiguous in memory, and if the cell rate is adopted some of the advantage of shuffling will be lost for STM traffic. However on balance, the loss of shuffling for STM should be small, hence the cell rate is the preferred option. There is one significant difference between the shuffle proposed by Beshai and Munter and that envisaged here. It has been found by simulation that when there is a large community of interest between one or more input-output link pairs, then the shuffle performs much better if the "straight through" position is skipped or bypassed. The "straight through" position is the set of connections that would obtain if there were no shuffle. Because input information is allocated by rule, no overall cross office control is required except insofar as it may be necessary to deal with overload situations.

With regard to memory savings in ETOSET/AIM, it should be noted that to make an arrangement with fan-in optics work at all, it is necessary to segregate the traffic into output link order in the input memory. This is also what is suggested above to make ETOSET/SR more cost effective. If the shutters of ETOSET/AIM could be made to perform the equivalent of the shuffling function, then this would go at least some way towards justifying the additional optical components that are needed for ETOSET/AIM. This aspect will now be considered in some detail.

Figures 19, 23:
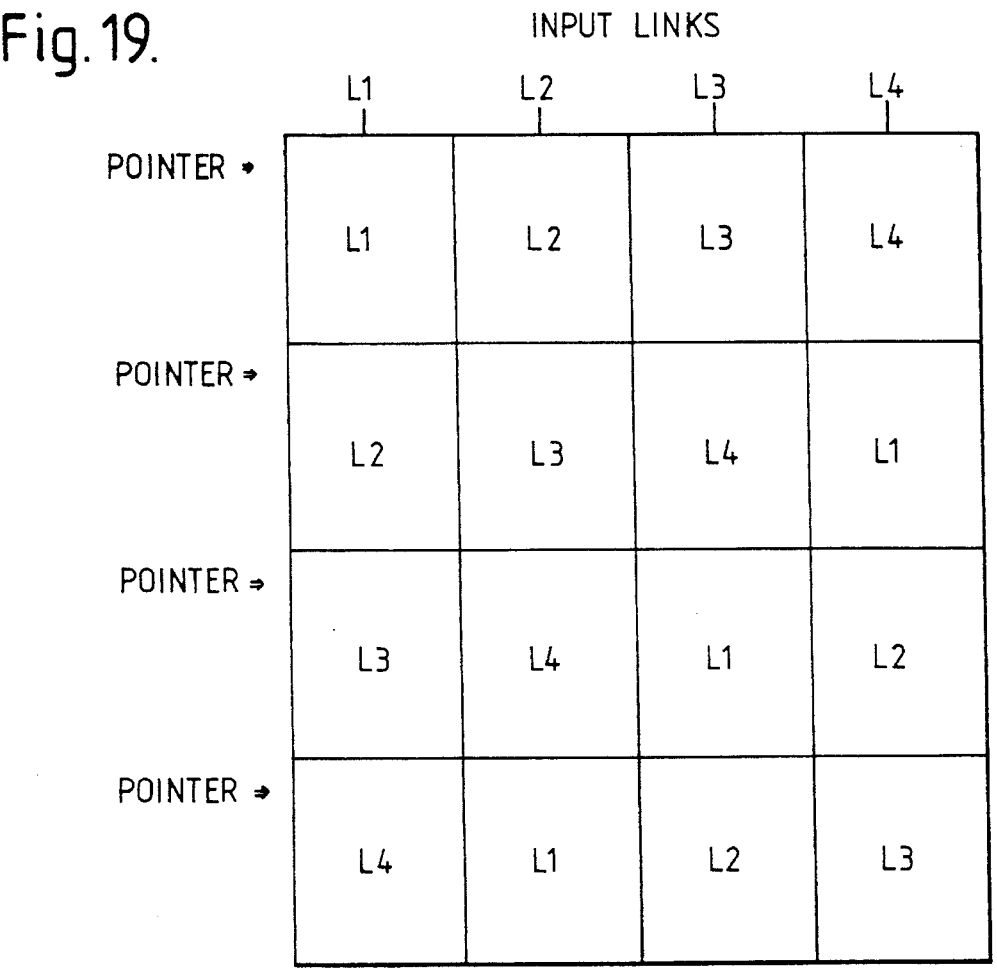
FIG. 19 illustrates segregation of input memory into designated destruction areas.
FIG. 23 is a table comparing SER memory requirements without and with a shuffle.

Memory for each incoming link is provisionally assigned as shown in FIG. 19. It should be noted that in the horizontal direction none of the assignments overlap, and that in each case an equal amount of memory is "self" assigned for the case where the incoming link and the outgoing link are the same. Because it is most unlikely that there will be appreciable test traffic that would need such an assignment, this memory can be regarded as effectively unassigned to be used as the other allocations overflow.

For each incoming link there is a set of pointers, one for each outgoing link, and as memory is allocated to incoming traffic these pointers are advanced. There are two bit maps for each allocatable increment of memory (memory slot), one bit map for the incoming link and the other for the outgoing link. The relevant bit must be free in both maps before a memory slot can be assigned. The number of shutters S, in the shutter plane of the switch is S=NB, where N is the number of links and B is the number of bits in each map.

Initially as incoming traffic arrives memory slots are allocated simply by moving the pointer one step and setting the relevant bits in the bit maps, such steps are called routine allocations. There will come a point, however when the pre-allocated memory is used up for some outgoing links and perhaps under-utilised for others. At this point a search procedure (directed searches) is initiated to find a pair of unused bits in the relevant bit maps. When such are found the relevant pointer is reset and the allocation procedure takes place in a different segment of memory. Clearly the self assigned memory is likely to be used in this situation.

In a traffic simulation a count was kept of the number of routine allocations and number of directed searches. The former representing a constant overhead and the latter an overhead that increases as the occupancy of the links increases and also as the community of interest between incoming and outgoing links increases. In other words, where there is a strong community of interest the assumption of quality of interest, which is the basis of the pre-allocation, is wrong and there are probably better algorithms for the initial allocation of storage. No attempt at re-arrangement of the previously assigned slots is attempted, although this could result in a more effective use of memory, the overhead in doing it is considered to be far too high.

In the following it is shown how distributed control can be achieved with optical communication across the switch, thus rendering an external electronic control module unnecessary.

FIG. 20 outlines the control arrangement for ETOSET/AIM for an example of four links. The input link information is replicated fourfold in the shutter plane and then concentrated at the output into a memory equal in capacity to that needed to store one frame. Each plane has optical transmitters and/or receivers so that control information can be carried optically through the switch, dispensing with the need to provide external circuits for control. The shutter plane is divided into 16 segments, each segment having a number of shutters equal to the number of memory slots per link; 64 are shown for illustrative purposes. Each shutter segment is denoted by Sxy, where x is the number of the input link and y is the number of the output link.

Control is highly distributed with each input link doing its own control processing independently. Each input link needs to know the busy-free status of memory slots in the output link, as discussed above. It communicates with the output links over permanently allocated optical paths through the switch in both directions. (The optical switch is capable of operating back-to-front). FIG. 21 shows how each input link has a set of four receivers and one transmitter for end to end communications and a second transmitter for communication with the shutter plane. Similarly each output link has a set of four receivers and one transmitter for communication with the input planes. The shutter plane has only receivers and is told which shutters to open by the input planes. Some means is required to prevent contention for output memory slots between input links and there are a number of possible ways of achieving this. Time division in which each input link is allocated a time slot for communication with output links is probably the simplest approach.

As explained above, each input link needs to read the bit map of the destination output link before allocating a memory slot. Thus reading of the bit map is by optical communication across the switch. Once the output bit map is set by the input link, i.e. a slot is allocated, the appropriate shutter may be opened in the shutter plane.

An alternative means of control is to confine optical communication for control to messages between the input plane and the shutter plane (the output plane is not involved). The saving in communication paths is however offset by the need for the different sectors of the input plane to communicate with each other in order to establish the busy/free state of output plane memory elements. Such internal input memory plane communication is probably best done by electronic rather than optical means and might make it more difficult to achieve the degree of modularity available to the three plane solution.

Figure 22:
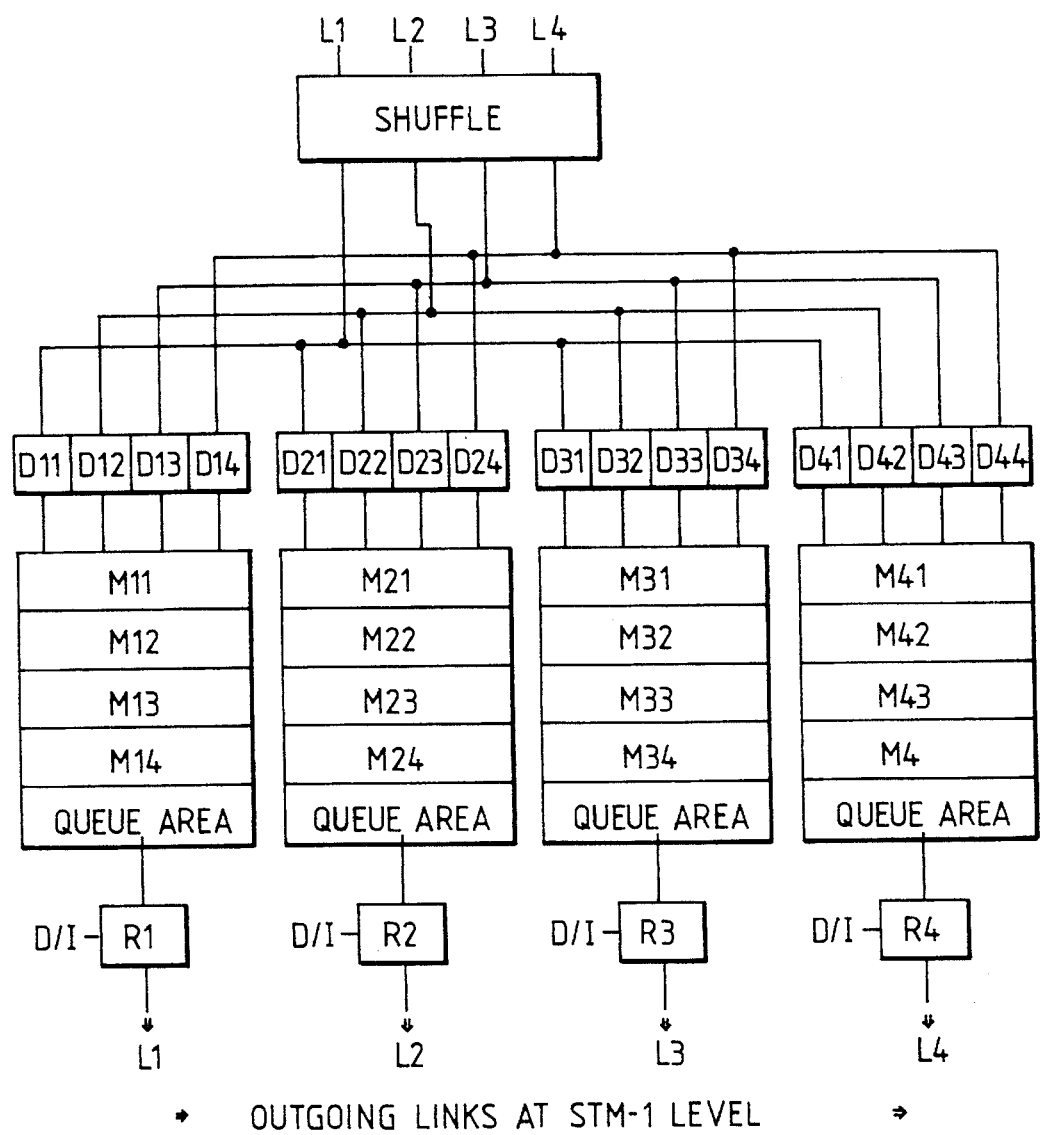
FIG. 22 illustrates schematically SER, broadcast to replicated memory, with shuffle.

We will now consider the case of memory saving in the SER case. FIG. 22 shows the Simple Electronic Replication case with the addition of a shuffle at the input. A similar arrangement to FIG. 16 is also possible which corresponds to FIG. 22 without the shuffle. This simpler arrangement gives a saving directly proportional to the maximum community of interest, e.g. if the community of interest resulted in a maximum of 60% common traffic between an incoming link and an outgoing link, then there would be a 40% memory reduction.

With or without the shuffle, each link's memory in FIG. 22 is divided into four areas, each of which can be written to in parallel from the appropriate incoming bit stream, but incoming information destined for other links is discarded.

For the arrangement of FIG. 22 with the shuffle in place, equations (2) and (4) apply, except that $R_o$ is 2 in this case. The table in FIG. 23 compares performance without and with shuffle. Here the savings are very significant, greater than that with ETOSET/SR and also greater than that without the shuffle (assuming the community of interest is substantial).

Because of the shuffling of the input information, the output information needs to be sorted before it can be output in the desired sequence over the transmission medium. This applies to any configuration involving shuffling.

FIG. 24 illustrates in principle how information might be stored in output memory. The diagram is for outgoing link 4 and shows the state at time slot 5 after the start of a frame at a time slot 1. The number in a memory column represents the link number from which the information came and the number at the side of an entry is the time slot in which it arrived. These items of information are related to each other in event registers shown at the bottom of the diagram. The event registers are written as part of the data writing-in process. Note that link 2 starts providing information to link 4 after a delay during which it might have had information for another link which would have been discarded at the link 4 interface. Of course there is normally no traffic from link 4 to link 4. Through the event registers, information that is segmented by the shuffling process can be reassembled into the correct contiguous order for output.

When comparing the basic SER and ETOSET designs it is apparent that the electronic solution entails rather more memory and much greater memory segmentation, which could well have an adverse impact on package count, than the optical solution. However both designs will work in a mixed ATM-STM environment. It should be noted that all of the designs considered here (except ATMOSPHERIC) replace switching in the conventional sense of the term with broadcasting and information filtering, however only those proposed in the present application and referred to as ETOSET or SER are capable of working in a mixed ATM-STM environment with common switch block hardware, even in the presence of the shuffle. Furthermore in the designs of the present application, transmission format conversion is performed as an integral part of the switching process.

We claim:

1. A switching architecture, including a plurality of incoming links and a plurality of outgoing links, and switch means for switching data between the incoming and outgoing links, which data is in serial form on said incoming links, the architecture further including means for converting said serial data into parallel form and comprising, for each incoming link, address decode and memory write means; one or more input memory blocks in which said data is stored at specific addresses; means for replicating the data whereby all incoming data are available for all or selected outgoing links, said converting, storing and replicating means being interconnected whereby the storage occurs before the replication or concurrently therewith and the replication occurs when the data is in serial or parallel form; means for each replication, for transferring data from one of said memory blocks to the appropriate one of said outgoing links, which transfer means is arranged either to read directly from the relevant address in said input memory blocks or to transfer the content of all or part of said input memory blocks simultaneously en bloc and in parallel to a plurality of output memory blocks, each associated with a respective outgoing link; and means for each outgoing link for taking the incoming data intended therefor and reading that data out in serial form, wherein there is a respective source memory for each incoming link, the decoded address information being stored in a respective area of the source memory, each of which source memories comprises a said input memory block, wherein means are provided to convert the source memory content to optical form and the replicating means comprises optical replicating means for acting on said optical form of the source memory content, there being a respective destination memory for each said outgoing link, each of which destination memories comprises a said output memory block, a respective read-out means being connected to each said destination memory, each outgoing link being connected to a respective read-out means and the read-out means serving only to read out the memory content intended for that outgoing link as determined from said stored address information, and including central or distributed control means controlling the operation of the address decode and memory write means, the source memories, the destination memories and the read-out means.

2. An architecture as claimed in claim 1, wherein the means for converting said serial data into parallel form and said memory blocks are together such that input data is arranged in a first spatially arranged page plane, and wherein the data arranged in said first plane is replicated optically to said outgoing links and replicating means comprising image replicating optics.

3. An architecture as claimed in claim 2, wherein the replicating means comprises holographic fan-out optics.

4. An architecture as claimed in claim 3, and including a shutter plane disposed between the incoming and outgoing links and serving to cause transfer of said part of the content of the first spatially arranged page plane to the outgoing output links.

5. An architecture as claimed in claim 4, and including fan-in optics disposed between the shutter plane and the outgoing links.

6. An architecture as claimed in claim 4, and including a second spatially arranged page plane disposed in front of said outgoing links and comprising said output memory blocks.

7. An architecture as claimed in claim 3, and wherein the holographic fan-out optics is comprised by a Fourier plane array generator.

8. An architecture as claimed in claim 2, wherein the replicating means is comprised by either a matrix-vector multiplier or a matrix-matrix multiplier.

9. An architecture as claimed in claim 2, wherein the first spatially arranged page plane is comprised by ferro-electric liquid crystal/very large scale integration (FELC/VLSI) on silicon technology.

10. An architecture as claimed in claim 6, wherein the second spatially arranged page plane is comprised by FELC/VLSI on silicon technology which serves also to read the transferred data out in serial form.

11. An architecture as claimed in claim 2, wherein said first spatially arranged plane comprises a page formatter plane including an input whereby incoming serial data is fed to a series of electronic logic units, each having a respective light modulating pad to a corresponding state.

12. An architecture as claimed in claim 11 and including laser means for reading the states of the modulators of the first plane, the replicating means serving to replicate the read states of the modulators and to transfer the information in parallel to said output memory blocks.

13. An architecture as claimed in claim 11 wherein each logic unit includes more than one memory cell whereby to facilitate simultaneous read-in and read-out of data.

14. An architecture as claimed in claim 13 wherein two memory cells which are written and read alternately are associated with each modulator.

15. An architecture as claimed in claim 1 wherein there is the same number of incoming links as there are input memory blocks but the links are not always connected to the same input memory block, the inputs on the incoming links being shuffled whereby to balance the overall input data traffic between the memory blocks.

16. An architecture as claimed in claim 1 and wherein the shuffle is such that the straight-through connections between links and memory blocks, which would pertain if there was no shuffle, are not permitted to occur.

17. An architecture as claimed in claim 16, wherein each plane has optical transmitters and/or receivers whereby control information can be carried optically through the switching architecture.

18. An architecture as claimed in claim 10 wherein the data incoming on each link is applied to all memory blocks via a respective address decode, serial to parallel conversion and memory write unit whereby storage and replication occurs concurrently, and wherein each memory block has a respective read-out unit coupled to a respective outgoing link and which serves to read directly from the relevant address in said input memory block the input data intended for the respective outgoing link.

19. An architecture as claimed in claim 18, and wherein there are the same number of incoming links as there are memory blocks but the links are not always connected to the same memory write units rather the inputs on the incoming links are shuffled therebetween.

* * * * *